United States Patent [19]
Yoshida et al.

[11] Patent Number: 5,574,117
[45] Date of Patent: Nov. 12, 1996

[54] ACRYLIC POLYMER, ITS USE AND PROCESS FOR PRODUCING IT

[75] Inventors: Masatoshi Yoshida, Nara; Masaya Uchida; Hiroyuki Ishida, both of Osaka; Kenji Minami, Shiga; Masuji Izubayashi, Hyogo; Yasumasa Tanaka, Osaka, all of Japan

[73] Assignee: Nippon Shokubai Co., Ltd., Osaka, Japan

[21] Appl. No.: 551,762

[22] Filed: Nov. 7, 1995

Related U.S. Application Data

[60] Continuation of Ser. No. 177,796, Jan. 5, 1994, abandoned, which is a division of Ser. No. 86,909, Jul. 7, 1993, abandoned.

[30] Foreign Application Priority Data

| Jul. 10, 1992 | [JP] | Japan | 4-183997 |
| Jul. 13, 1992 | [JP] | Japan | 4-185519 |
| Jul. 30, 1992 | [JP] | Japan | 4-204129 |
| Apr. 21, 1993 | [JP] | Japan | 5-094404 |

[51] Int. Cl.$^6$ ................................... C08F 2/02
[52] U.S. Cl. .................. 526/224; 526/222; 526/317.1
[58] Field of Search ........................... 526/222, 317.1, 526/224; 525/309

[56] References Cited

U.S. PATENT DOCUMENTS

| 3,960,824 | 9/1971 | Hicks . | |
| 4,507,454 | 3/1985 | Hutton et al. | 526/317 |
| 4,833,221 | 5/1989 | Albrecht | 526/208 |
| 4,851,278 | 7/1989 | Enanoza | 525/309 |
| 5,057,366 | 10/1991 | Husman et al. | 525/309 |
| 5,073,615 | 12/1991 | Shen | 526/62 |

FOREIGN PATENT DOCUMENTS

| 2145498 | 2/1973 | France . |
| 55401 | 7/1971 | Japan . |
| 59-48121 | 3/1984 | Japan . |
| 60-219204 | 11/1985 | Japan . |
| 61-272206 | 12/1986 | Japan . |
| 62-41523 | 9/1987 | Japan . |
| 63-210113 | 8/1988 | Japan . |
| 2-55448 | 11/1990 | Japan . |
| 845672 | 8/1960 | United Kingdom . |

*Primary Examiner*—Jeffrey T. Smith
*Attorney, Agent, or Firm*—Armstrong, Westerman, Hattori, McLeland & Naughton

[57] ABSTRACT

The present invention provides an acrylic polymer containing no surfactant, having little limitation in the polymer composition and being superior in heat resistance, processing operation performance and fluidity, and also provides use of the polymer and a production process. An acrylic polymer of present invention is obtained by the bulk polymerization, contains an acrylic acid-based monomer unit as a main component in its structure and has a Mn of 1,000 to 1,000,000, a glass transition temperature of −80° C. or higher and a Mw/Mn ratio of 5 or less, and is appropriate for acrylic rubber, a pressure-sensitive adhesive, an alkali-soluble adhesive, an alkali-soluble film, an alkali-soluble injection molding or water ink. This polymer is produced by, in the presence of an inactive gas, carrying out the bulk polymerization of a starting material which contains a monomer component having an acrylic acid-based monomer as a main component and contains a sulfur compound of 0.001 to 20 parts by weight based on 100 parts by weight of the monomer component, and contains a polymerization initiator in the weight of one-third or less based on the sulfur compound.

35 Claims, No Drawings

ACRYLIC POLYMER, ITS USE AND PROCESS FOR PRODUCING IT

This application is a continuation of application Ser. No. 08/177,796 filed Jan. 5, 1994, now abandoned which is a divisional of application Ser. No. 08/086,909 filed Jul. 7, 1993, now abandoned.

BACKGROUND OF THE INVENTION

The present invention relates to an acrylic polymer used for acrylic rubber, a pressure-sensitive adhesive, an alkali-soluble adhesive, an alkali-soluble film, an alkali-soluble injection molding, water ink, a coating, a low profile agent, a dispersing agent, a fiber-processing agent, a sealing agent, a vibration-controlling material, a resin improver, an asphalt additive and so forth, and also relates to use of the polymer and a process for producing it.

An acrylic polymer is used for acrylic rubber, a pressure-sensitive adhesive, an alkali-soluble adhesive, an alkali-soluble film, an alkali-soluble injection molding, water ink, a coating, a low profile agent, a dispersing agent, a fiber-processing agent, a sealing agent, a vibration-controlling material, a resin improver, an asphalt additive and so forth.

Also, because an acrylic polymer of high acid value is soluble in an alkali, it is used in a dissolved condition for ink, floor polish, coating of paper, paint, an adhesive, a pressure-sensitive adhesive. Also, because the polymer of high acid value has the advantage that it can be recovered by dissolve it in an alkali, it is used for a molding material, a vessel, film, a label and so forth.

An acrylic polymer is generally produced by carrying out a radical polymerization reaction of a monomer component containing an acrylic acid-based monomer as a main component till reaching a high polymerization conversion. The radical polymerization is generally carried out by the emulsion polymerization, suspension polymerization, solution polymerization, or bull polymerization.

The emulsion polymerization, suspension polymerization, and solution polymerization have an advantage that, because the polymerization is carried out by dispersing a monomer into a dispersion medium, polymerization temperature can be easily regulated and a reaction solution is easy to run even when the polymerization conversion has become high. However, they have following defects.

In the emulsion polymerization and suspension polymerization, a precipitating process (which is necessary in the case of emulsion polymerization), a filtering process and a drying process are necessary for isolating a polymer from a dispersion medium, the procedure is complex and productivity is poor, and in addition, a surfactant such as an emulsifier or a dispersing agent mingles into an obtained acrylic polymer and a pure polymer is difficult to obtain. An acrylic polymer in which the surfactant remains is inferior in water resistance and, according to the use, also inferior in strength or cohesion. If a macromolecular acrylic polymer is produced by the emulsion polymerization or suspension polymerization, a gel portion is formed and fluidity is poor. In carrying out a copolymerization reaction by the emulsion polymerization or suspension polymerization, according to the desired composition of a polymer, to selectively employ plural kinds of monomers of different hydrophilic properties is necessary, however, because there is a case where emulsifying or suspending is impossible, the obtainable polymer has composition limitation.

In the solution polymerization, because a large amount of an organic solvent is used as a dispersion medium, there is a trend that a large amount of low molecular weight products are formed and that the molecular weight distribution (which is also called "polydispersity coefficient" or "polydispersity index") of acrylic polymers becomes broad, and heat resistance or processing operation performance of the polymers lowers, so that, according to the use, disadvantage occurs. Also, if a large amount of an organic solvent is used, because the solvent must be volatilized in order to isolate the polymer, productivity is poor.

In contrast, because the bulk polymerization does not use any dispersion medium and does not need the aforementioned surfactants, it has not such defects as mentioned above and is an industrially advantageous process. However, if a polymerizable monomer of which polymerization reactivity is very intensive is subjected to the bulk polymerization, this polymerization is hard to control. Therefore, according to the sort of monomers, conversion into a polymer of high molecular weight and designing the molecular weight distribution may become difficult, products gelated (gelled) or deteriorated may be formed due to rapid and intensive exothermic polymerization, or, in the worst case, explosion occurs.

Among polymerizable monomers, styrene and methyl methacrylate have been known in that their bulk polymerization can be controlled, and this polymerization reaction has been studied from old times and industrialized.

A styrene-based polymer is industrially obtained by carrying out a bulk polymerization reaction of styrene or a monomer mixture mainly containing it up to high polymerization conversion in the presence or absence of a polymerization initiator and then by volatilizing a small amount of residual unreacted styrene. Also, although styrene can be mildly polymerized by a thermic polymerization reaction in the absence of a polymerization initiator, a mercaptan is occasionally used for molecular weight control. In this case, a chain transfer reaction of the mercaptan is active, so that a polymer of broad molecular weight distribution is formed.

In the bulk polymerization reaction of methyl methacrylate, methyl methacrylate or a monomer mixture mainly containing it is polymerized in the presence of a polymerization initiator. However, because it is difficult to obtain a polymer having a narrow molecular weight distribution in the case of high polymerization conversion, the polymerization is stopped at the stage of such a low polymerization conversion as about 60% and a large amount of unreacted monomer is volatilized. This is because the polymerization rate of methyl methacrylate is faster than that of styrene and, in addition, if the polymerization conversion becomes high, the polymerization rate is accelerated owing to a gel effect (which is a phenomenon that the polymerization rate becomes fast when the viscosity of a reaction mixture becomes high with progress of a polymerization reaction) and uneven temperature distribution occurs in a reaction medium, and therefore, a part, where a polymerization reaction does not so proceed, and a part, where a polymerization reaction rapidly and intensively proceeds, coexists.

As mentioned above, even in a case of methyl methacrylate of which polymerization reaction is far milder compared with that of an acrylic acid-based monomer such as methacrylic acid, acrylic acid and an acrylic acid ester, the bulk polymerization reaction is stopped at a stage of low polymerization conversion. Therefore, a bulk polymerization reaction of the acrylic acid-based monomer of which polymerization reaction is more intensive than that of methyl methacrylate is difficult to control reaction temperature, and generally, it is not practically used at all. In Japanese Official Patent Gazette Nos. showa 62-41523 and heisei 2-55448, there has been proposed the bulk polymerization reaction of an acrylic acid-based monomer using a screw extruder. The bulk polymerization of an acrylic acid-based monomer proposed in these gazettes comprises: introducing a polymerization initiator and the acrylic acid-based monomer into the screw extruder of specific structure, and then raising viscosity in a short time by taking advantage of rapid and intensive reaction so as to transfer a solution with a screw. In Japanese Official Patent Gazette No. showa 55-401, there has been proposed a bulk polymerization reaction comprising using an organic mercaptan in the presence of oxygen.

In a case of using an acrylic polymer of high molecular weight for various uses, a high molecular weight component in the polymer displays necessary performance and a low molecular weight component i n the polymer becomes an origin of performance-lowering. On the other hand, in a case of using an acrylic polymer of low molecular weight for various uses, a low molecular weight component in the polymer displays necessary performance and a high molecular weight component in the polymer becomes an origin of performance-lowering. Accordingly, an acrylic polymer having a narrow molecular weight distribution is desired.

According to the methods in the above-mentioned Japanese Official Patent Gazette Nos. showa 62-41523 and heisei 2-55448, because temperature of the reaction solution does not rapidly rise but stepwise rises as the polymerization conversion becomes higher, the bulk polymerization reaction of an acrylic acid-based monomer can be carried out without causing a runaway reaction. However, an obtained acrylic polymer contains a large amount of low molecular weight component and its molecular weight distribution Mw/Mn is very large such as about 8 to 13, so that heat resistance or processing operation performance is poor. For example, in a case of using the polymer as a polymer for coating, a low molecular weight component lowers coating film strength and contamination resistance or, if a high molecular weight component is contained more than necessity, the viscosity of solution is high, so that operation performance is bad. In addition, because the bulk polymerization in said Japanese Official Patent Gazette Nos. showa 62-41523 and heisei 2-55448 uses a rapid and intensive reaction of an acrylic acid-based monomer, its practically use is possible on a small scale such as a laboratory level, but difficult on an industrial scale from viewpoint of safety.

On the other hand, according to the method in said Japanese Official Patent Gazette No. showa 55-401, heat generation can be relatively easily controlled, however, oxygen exists, so that the gas phase part is in a range of explosion and there is a danger of explosion which may occur due to the presence of an ignition source. Even if this danger could be avoided, the polymer is colored very much. Therefore, the method is not preferable one as a method for producing an acrylic polymer which is characterized by transparency.

Currently, it is actual circumstances that there is no skill of producing industrially with good productivity and safely an acrylic polymer which has a narrow molecular weight distribution and does not contain the above-mentioned surfactant.

SUMMARY OF THE INVENTION

It is an object of the present invention to provide an acrylic polymer and its use, in which a surfactant is not contained, polymer composition is limited little, a molecular weight distribution is narrow, and heat resistance, processing operation performance and fluidity are excellent. Furthermore, it is another object of the present invention to provide a suitable production process for obtaining an acrylic polymer of the above sort without mingling of an emulsifier and a dispersing agent and with little coloring of the polymer, good productivity and safety.

To solve the above-mentioned subjects, the present invention provides an acrylic polymer obtained by a bulk polymerization reaction. This polymer is characterized in containing an acrylic acid-based monomer unit (a) as a main component in its structure and having a number-average molecular weight in a range of from 1,000 to 1,000,000, a glass transition temperature of −80° C. or higher and a molecular weight distribution (Mw/Mn) of 5 or less. The monomer units other than the monomer unit (a) are the undermentioned monomer units (b-1) and/or (b-2).

If a number-average molecular weight, a glass transition temperature or a molecular weight distribution deviates from the above range, an acrylic polymer of the present invention has following problems. If the number-average molecular weight is lower than 1,000, processing operation performance of the polymer, coating film strength and contamination resistance are low and, if it exceeds 1,000,000, fluidity of the polymer is poor. If the molecular Height distribution exceeds 5, heat resistance or processing operation performance of the polymer is poor. The lower limit of glass transition temperature, −80° C., is defined because of no existence of an acrylic polymer having a glass transition temperature lower than −80° C., and does not relate to performance of an acrylic polymer.

The present invention comprises the use of an acrylic polymer which the above-described invention provides.

Among the above-mentioned acrylic polymers which the above-described invention provides, such as containing an acrylic acid-based monomer unit (a) in proportion of from 60 to 100% by weight and a crosslinkable functional group in proportion of from 0.01 to 1.4 mmol/g in its structure and having a number-average molecular weight in a range of from 200,000 to 1,000,000, a glass transition temperature in a range of from −80° to 0° C. and a molecular weight distribution (Mw/Mn) of 3 or less is preferably used for acrylic rubber.

In an acrylic polymer of present invention used for acrylic rubber, if the amount of a monomer unit (a), the amount of a crosslinkable functional group, a number-average molecular weight, a glass transition temperature or a molecular weight distribution deviates from the above range, there are the following problems. If the amount of a monomer unit (a) is smaller than 60% by weight, oil resistance or heat resistance, both of which are characteristics of acrylic rubber, deteriorates. If the amount of a crosslinkable functional group is smaller than 0.01 mmol/g, strength of acrylic rubber is inferior and, if it exceeds 1.4 mmol/g, a scorch time is too short or elongation of rubber is too small. The number-average molecular weight is preferably in a range of from 200,000 to 500,000, the glass transition temperature is preferably in a range of from −70° C. to −10° C., and the molecular weight distribution is preferably in a range of from 1.0 to 2.5. If the number-average molecular weight lower than 200,000, when mixing operation by an open roll is carried out, tackiness to the roll is recognized and working performance is bad and, if it exceeds 1000,000, fluidity becomes poor, so that molding performance becomes bad. The lower limit of glass transition temperature, −80° C., is defined because of no existence of an acrylic polymer having a glass transition temperature lower than −80° C., and does not relate to performance of an acrylic polymer for acrylic rubber. However, if the glass transition temperature is higher than 0° C., sufficient rubber-like performance is not displayed. If the molecular weight distribution exceeds 3, a low molecular weight component is too much, so that mixing operation performance by an open roll is bad, or a high molecular weight component is too much, so that molding performance is bad.

An acrylic polymer of present invention for acrylic rubber is mixed with a conventional vulcanizing agent (crosslinking agent) and other combining components (for example, a reinforcing agent, a filler, an antioxidant, a plasticizer, a lubricant) and then heated generally at 120° C. or higher to crosslink, so that the polymer becomes acrylic rubber. After the polymer is crosslinked, it may be mixed with the above-mentioned other combined component. The combining components to produce acrylic rubber is not especially limited, however, an example is 0.1 to 10% by weight of a vulcanizing agent (crosslinking agent), 0 to 60% by weight of a reinforcing agent or filler, 0 to 10% by weight of an antioxidant, 0 to 10% by weight of a plasticizer, 0 to 2% by weight of a lubricant, and 8 to 99.9% by weight of an acrylic polymer of present invention for acrylic rubber; the percents are based on the total of all components. The thus-obtained acrylic rubber, compared with conventional ones, shows compatible mixing operation performance and molding performance and has an advantage of high water resistance and high strength. Therefore, it is useful for various kinds of sealing materials (gasket, packing, O-ring, oil seal and so forth), various kinds of tubes, and coating materials and, in addition, various kinds of belts, rolls and so forth.

Here, preferable vulcanizing agents (crosslinking agents) are zinc dimethyldithiocarbamate, maleic acid, methoxymethylmelamine, o-cresol novolak epoxy, diaminodiphenylmethane and so forth. Preferable reinforcing agents or fillers are carbon black, silica-based anhydrous silicic acid, calcium carbonate, talc and so forth. Preferable antioxidants are phenyl-1-naphthylamine, 2-mercaptobenzimidazole, nickel diethyldithiocarbamate and so forth. Preferable plasticizers are macromolecular ester type Paraplex G-25 (made by Rohm & Haas Co., LTD.) and so forth. Preferable lubricants are stearic acid and so forth.

Among the above-mentioned acrylic polymers of present invention, such as containing an acrylic acid-based monomer unit (a) in proportion of from 60 to 100% by weight and a crosslinkable functional group in proportion of from 0.005 to 1.4 mmol/g in its structure and having a number-average molecular weight in a range of from 10,000 to 500,000 and a glass transition temperature in a range of from −80° to −30° C. is preferably used for a pressure-sensitive adhesive.

In an acrylic polymer of the present invention used for a pressure-sensitive adhesive, if the amount of the monomer unit (a), the amount of a crosslinkable functional group, a number-average molecular weight, a glass transition temperature or a molecular weight distribution deviates from the above range, there are the following problems. If the amount of a crosslinkable functional group is smaller than 0.005 mmol/g, cohesion is inferior and, if it exceeds 1.4 mmol/g, adhesive strength is inferior. The number-average molecular weight is preferably in a range of from 20,000 to 300,000, the glass transition temperature is preferably in a range of from −80° to −40° C., and the molecular weight distribution is preferably in a range of from 1.0 to 4.0. If the number-average molecular weight is lower than 10,000, there are problems that cohesion is deficient and heat resistance deteriorates, or adhesive transfer is easy to occur when removed, or a large amount of a crosslinking agent is required. If the number-average molecular weight exceeds 500,000, fluidity of the polymer is poor, coating performance of the polymer deteriorates, and compatibitity with other components used for the pressure-sensitive adhesive deteriorates. The lower limit of glass transition temperature, −80° C., is defined because of no existence of an acrylic polymer having a glass transition temperature lower than −80° C., and does not relate to performance of an acrylic polymer for a pressure-sensitive adhesive. However, if the glass transition temperature is higher than −30° C., tackiness is not sufficiently displayed. If the molecular weight distribution exceeds 5, a low molecular weight component is too much, so that heat resistance deteriorates or adhesive transfer is easy to occur when removed. An acrylic acid-based monomer unit (a) is a main component of the polymer and is in proportion of from 60 to 100% by weight. If the proportion of unit (a) is lower than 60% by weight, tackiness which is a characteristic of a pressure-sensitive adhesive may deteriorate.

An acrylic polymer of the present invention for a pressure-sensitive adhesive is used by itself as a pressure-sensitive adhesive or used as the adhesive by combining the polymer with a combining component such as a crosslinking agent, a solvent, a tackifier and so forth of common use. The latter pressure-sensitive adhesive composition has, for example, composition consisting of 100 parts by weight of an acrylic polymer of the present invention for a pressure-sensitive adhesive, 0 to 5 parts by weight of a crosslinking agent, 0 to 400 parts by weight of a solvent, and 0 to 100 parts by weight of a tackifier. Preferable crosslinking agents are an isocyanate compound, an epoxy compound, a melamine compound, a metal chelate compound and so forth. Preferable solvents are toluene, ethyl acetate, acetone and so forth. Preferable tackifiers are rosin, polymerized rosin, hydrogenated rosin, heterogeneous rosin and an esterified product thereof, terpene resin, terpene-phenol resin, petroleum resin and so forth. The pressure-sensitive adhesive thus-obtained has an advantage that, compared with conventional ones, cohesion, heat resistance and high temperature performance are superior and that the adhesive transfer when removed is little, and it is useful for various kinds of double-coated tapes, various kinds of one-coated tapes, films, labels, sheets and so forth.

Among the above-mentioned acrylic polymers of present invention, such as containing an acrylic acid-based monomer unit (a) in proportion of from 50 to 100% by weight in its structure and having an acid value of 65 mg/g or higher, a number-average molecular weight in a range of from 5,000 to 200,000, a glass transition temperature of 0° C. or higher and a molecular weight distribution (Mw/Mn) of 3 or less is preferably used for an alkali-soluble adhesive.

In an acrylic polymer of the present invention used for an alkali-soluble adhesive, if the amount of the monomer unit (a), an acid value, a number-average molecular weight, a glass transition temperature or a molecular weight distribution deviates from the above range, there are the following problems. If the amount of a monomer unit (a) is smaller than 50% by weight, adhesive strength occasionally lowers or solubility in an aqueous alkali occasionally becomes poor. If the acid value is lower than 65 mg/g, solubility in an aqueous alkali becomes poor. If the number-average molecular weight is lower than 5,000, adhesive strength is liable to lower and, especially, heat-resistant adhesive strength becomes insufficient. If the number-average molecular weight exceeds 200,000, the viscosity is high and operation performance becomes poor in any one of a case of using the polymer in the form of an aqueous solution and a case of using the polymer as hot melt resin. If the glass transition temperature is lower than 0° C., adhesive strength is liable to lower and especially, heat-resistant adhesive strength becomes insufficient. If the molecular weight distribution exceeds 3, in a case where the amount of a low molecular weight component is large, adhesive strength becomes insufficient, and in a case where the amount of a high molecular weight component is large, operation performance becomes poor.

An acrylic polymer of the present invention for an alkali-soluble adhesive is used by itself as an alkali-soluble adhesive or used as the adhesive by combining the polymer with a combining component such as wax, a tackifier and so forth of common use.

The combining components to produce an alkali-soluble adhesive is not limited, however, for example, 0 to 400 parts by weight of a solvent, 0 to 50 parts by weight of wax and 0 to 50 parts by weight of a tackifier can be combined with 100 parts by weight of an acrylic polymer of the present invention for an alkali-soluble adhesive.

Here, for the solvent there are cited toluene, ethyl acetate, acetone, methanol, an aqueous alkali and so forth. For the wax there are cited calcium stearate, barium stearate, polypropylene wax, polyethylene wax, carnauba wax paraffin wax and so forth. For the tackifier there are cited a rosin-based tackifier, a terpene-based tackifier, a petroleum resin-based tackifier and so forth.

The thus-obtained alkali-soluble adhesive, compared with conventional ones, is superior in both of adhesion and cohesion at normal temperature. In a case of using the adhesive as hot melt resin with no use of a solvent, the adhesive has the advantage of having good melt coating operation performance at high temperature as well as being high in thermal stability, and in addition, is soluble in an alkali. Therefore, the adhesive is useful for the bookbinding, attachment of a label to a bottle and a bag, temporary adhesion of cloths, and other use.

Among the above-mentioned acrylic polymers of present invention, such as containing an acrylic acid-based monomer unit (a) in proportion of from 60 to 100% by weight in its structure and having an acid value of 65 mg/g or higher, a number-average molecular weight in a range of from 10,000 to 500,000, a glass transition temperature of 0° C. or higher and a molecular weight distribution (Mw/Mn) of 4 or less is preferably used for an alkali-soluble film.

In an acrylic polymer of the present invention used for an alkali-soluble film, if the amount of the monomer unit (a), an acid value, a number-average molecular weight, a glass transition temperature or a molecular weight distribution deviates from the above range, there are the following problems. If the amount of a monomer unit (a) is smaller than 60% by weight, softness of a film occasionally lowers, or weather resistance and heat resistance occasionally becomes poor. If the acid value is lower than 65 mg/g, solubility in an aqueous alkali becomes poor. If the number-average molecular weight is lower than 10,000, film strength is liable to lower and blocking resistance becomes inferior. If the number-average molecular weight exceeds 500,000, hot melt viscosity becomes high and film-molding performance becomes poor. If the glass transition temperature is lower than 0° C., blocking resistance of a film becomes poor. If the molecular weight distribution exceeds 4, in a case where the amount of a low molecular weight component is large, film strength and blocking resistance lower, and in a case where the amount of a high molecular weight component is large, film-molding performance lowers.

An acrylic polymer of the present invention for an alkali-soluble film is used by itself as an alkali-soluble film or used as the film by combining the polymer with a combining component such as a filler, a lubricant and so forth of common use.

The combining components to produce an alkali-soluble film is not limited, however, for example, 0 to 100 parts by weight of a filler and 0 to 5 parts by weight of a lubricant can be combined with 100 parts by weight of an acrylic polymer of the present invention for an alkali-soluble film.

Here, for the filler there are cited kaoline, mica, barium sulfate, calcium phosphate, talc and so forth. For the lubricant there are cited zinc stearate, calcium stearate, barium stearate and so forth.

The thus-obtained alkali-soluble film, compared with conventional ones, has good molding performance and high strength, and also, is superior in blocking resistance and soluble in an alkali. Therefore, the film is useful as a packaging film, a base material of labels, and in addition, as a separating film in a case of storing specific substances in condition of separating each other for a short period of time. For practical examples the separating film there are cited a Film for agricultural use, packaging of the washing, packaging of food for animals, a temporarily protecting film and so forth.

Among the above-mentioned acrylic polymers of present invention, such as containing an acrylic acid-based monomer unit (a) in proportion of from 60 to 100% by weight in its structure and having an acid value of 65 mg/g or higher, a number-average molecular weight in a range of From 5,000 to 200,000, a glass transition temperature of 70° C. or higher and a molecular weight distribution (Mw/Mn) of 4 or less is preferably used for an alkali-soluble injection molding.

In an acrylic polymer of the present invention used for an alkali-soluble injection molding, if the amount of the monomer unit (a), an acid value, a number-average molecular weight, a glass transition temperature or a molecular weight distribution deviates from the above range, there are the following problems. If the amount of a monomer unit (a) is smaller than 60% by weight, a molding is fragile, so that strength becomes insufficient, or solubility in an aqueous alkali becomes poor. If the acid value is lower than 65 mg/g, solubility in an aqueous alkali becomes poor. If the number-average molecular weight is lower than 5,000, strength of a molding lowers. If the number-average molecular weight exceeds 200,000, the hot melt viscosity becomes high, that molding performance becomes poor, and in addition, the dissolving rate into an aqueous alkali solution lowers. If the glass transition temperature is lower than 70° C., heat resistance of a molding is insufficient. If the molecular weight distribution exceeds 4, in a case where the amount of a low molecular weight component is large, strength of a molding is insufficient, and in a case where the amount of a high molecular weight component is large, molding performance as well as solubility in an aqueous alkali becomes poor.

An acrylic polymer of the present invention for an alkali-soluble injection molding is used by itself as an alkali-soluble injection molding or used as the molding by combining the polymer with a combining component such as a filler, a lubricant and so forth of common use.

The combining components to produce an alkali-soluble injection molding is not limited, however, for example, 0 to 900 parts by weight of a filler and 0 to 5 parts by weight of a lubricant can be combined with 100 parts by weight of an acrylic polymer of the present invention for an alkali-soluble injection molding.

Here, for the filter there are cited kaoline, mica, glass beads, glass fiber, barium sulfate, calcium phosphate, talc and so forth. For the lubricant there are cited zinc stearate, calcium stearate, barium stearate and so forth.

The thus-obtained alkali-soluble injection molding, compared with conventional ones, has good molding performance and high strength, and also, is well soluble in an aqueous alkali. Therefore, the molding is useful as resin for lost core, the tableware such as a spoon, a fork, a bowl and the like, a food tray, and so forth.

Among the above-mentioned acrylic polymers of present invention, such as containing an acrylic acid-based monomer unit (a) in proportion of from 50 to 100% by weight in its structure and having an acid value of 65 mg/g or higher, a number-average molecular weight in a range of from 1,000 to 50,000, a glass transition temperature of 30° C. or higher and a molecular weight distribution (Mw/Mn) of 3 or less is preferably used for water ink.

In an acrylic polymer of the present invention used for water ink, if the amount of the monomer unit (a), an acid value, a number-average molecular weight, a glass transition temperature or a molecular weight distribution deviates from the above range, there are the following problems. If the amount of a monomer unit (a) is smaller than 50% by weight, abrasion resistance of printed matter occasionally lowers or solubility in water is occasionally insufficient. If the acid value is lower than 65 mg/g, solubility in an aqueous alkali or water becomes poor. If the number-average molecular weight is lower than 1,000, abrasion resistance of printed matter lowers or water resistance is inferior. If the number-average molecular weight exceeds 50,000, the viscosity of ink becomes high, so that printability becomes poor. If the glass transition temperature is lower than 30° C., drying and durability of the printed matter becomes inferior. If the molecular weight distribution exceeds 3, in a case where the amount of a low molecular weight component is large, abrasion resistance and water resistance of the printed matter becomes inferior, and in a case where the amount of a high molecular weight component is large, printability becomes poor.

An acrylic polymer of the present invention for water ink is used as the ink by combining the polymer with a combining component such as a coloring material (a pigment, a dye and the like), resin, other additives, water, an alcohol and so forth of common use.

The combining components to produce water ink is not limited, however, for example, 40 to 200 parts by weight of a coloring material, 0 to 100 parts by weight of resin, 10 to 30 parts by weight of an alkali, 0.7 to 10 parts by weight of a defoaming agent, 10 to 25 parts by weight of wax and 120 to 250 parts by weight of a solvent can be combined with 100 parts by weight of an acrylic polymer of the present invention for water ink.

Here, for the coloring material there are cited an organic pigment, for example, red-based one such as fast red and lithol red, yellow-based one such as disazo yellow and Hansa yellow, deep blue-based one such as cyanine blue, violet-based one such as fast violet, black one such as carbon black, and so forth; an inorganic pigment, for example, titanium oxide which is used under mixed conditions in a case of color such as white, ultramarine and light (pale) yellow. For the resin there are cited casein, shellac, an emulsion of styrene-acrylic polymer, and so forth. For the alkali there are cited aqueous ammonia, triethylamine, ethanolamine, diethanolamine, triethanolamine and so forth. For the defoaming agent there are cited a silicone-based defoaming agent, a higher alcohol, pine oil, a surfactant and so forth. For the wax there are cited wax in which fine particles of polyethylene or polypropylene is dispersed, and others. For the solvent there are usually used a mixture between water and an alcohol, of which alcohol content is about 5 to 30%. For the alcohol there are cited isopropyl alcohol and ethyl alcohol.

The thus-obtained water ink, compared with conventional ones, is excellent in pigment dispersibility and viscosity stability, has fast drying performance, and is superior in water resistance and abrasion resistance of the printed matter. Therefore, the ink is useful as flexoink such as ink for printing a ruled line, ink for printing a kraft paper bag of multiple layers, ink for printing corrugated cardboard, and so forth.

The present invention provides a production process preferable for obtaining a polymer including the above-mentioned acrylic polymer and other members. That is, the present invention provides a process for producing an acrylic polymer, comprising carrying out a bulk polymerization reaction of a monomer component which contains an acrylic acid-based monomer as a main component. This process in is characterized that a bulk polymerization reaction of a s tarring material for polymerization is carried out in the presence of an inactive gas and that the starring material for polymerization contains said monomer component as well as a sulfur compound in proportion of from 0.001 to 20 parts by weight based on 100 parts by weight of the total of the monomer component and contains a polymerization initiator in proportion by weight of one-third or less based on the weight of the sulfur compound.

Here, in the specification, the "acrylic acid-based monomer" is at least one member selected from the group consisting of acrylic acid, an acrylic acid salt, an acrylic acid derivative, methacrylic acid and a methacrylic acid salt, with the proviso that a methacrylic acid ester is not included.

In the present invention, the above-mentioned starting material for polymerization contains practically no polymerization initiator or can contain the polymerization initiator in proportion by weight of one-third or less based on the weight of the sulfur compound.

The inventors extensively studied the bulk polymerization reaction of an acrylic acid-based monomer of which bulk polymerization was said to be practically impossible. As a result, they elucidated an art to control "the rapid and intensive exothermic polymerization reaction due to its very fast rate" and found a process which is capable of designing the copolymer composition optionally and applicable for obtaining a homogeneous polymer of narrow molecular weight distribution. According to the present invention, rapid and intensive heat generation in the course of bulk polymerization is suppressed and a mild polymerization rate is obtained, so that a homogeneous acrylic polymer of narrow molecular weight distribution is produced.

In a case of carrying out the bulk polymerization reaction of a monomer component containing an acrylic acid-based monomer as a main component, no practical inclusion of a polymerization initiator in a polymerization system was examined, however, even if the reaction system does not practically include the polymerization initiator, in many cases, the polymerization reaction can no t be controlled by rapid and intensive heat generation and, occasionally, a gelated (gelled) product is produced.

The sulfur compound is a compound which makes mild a bulk polymerization reaction of a monomer component containing an acrylic acid-based monomer as a main component, controls molecular weight, produces a polymer of narrow molecular weight distribution, and furthermore, which is used to solve a problem that occurs in a case where the polymerization system includes a polymerization initiator as well as in a case of no practical inclusion of the polymerization initiator.

The role of a sulfur compound in the process of present invention is important and the sulfur compound has both the roles of controlling polymerization rate and molecular weight. When the bulk polymerization is carried out, a polymerization system needs to contain a sulfur compound. An amount for use of the sulfur compound is in proportion of 0.001 to 20 parts by weight, preferably in proportion of 0.05 to 5 parts by weight, based on 100 parts by weight of the total of monomer components. If the amount for use of a sulfur compound is smaller than 0.001 part by weight, a rapid and intensive reaction is unpreferably accompanied on the way of a polymerization reaction. If the amount for use of the sulfur compound exceeds 20 parts by weight, contrary, the polymerization rate becomes too slow, so that the productivity unpreferably becomes poor.

The sulfur compound used in the present invention is not especially limited as far as it is an organic compound having a S atom and can generate a free radical under conditions of bulk polymerization. For example, it is at least one member selected from the group consisting of a mercaptan, a disulfide compound, a thiuram compound and a trisulfide compound.

In a case of using a mercaptan as the sulfur compound, the amount for use of the mercaptan is, for example, in order to obtain a macromolecular polymer, in proportion of 0.001 to 1.0 part by weight, preferably in proportion of 0.005 to 0.7 parts by weight, based on 100 parts by weight of the total of monomer components. While the bulk polymerization reactions of styrene and methyl methacrylate can be carried out under stable conditions with no catalyst, the polymerization reaction of a acrylic acid-based monomer proceeds with a fast rate, therefore, in many cases, a runaway reaction occurs even with no catalyst. Accordingly, if the amount for use of a mercaptan is smaller than 0.001 part by weight, a rapid and intensive reaction is unpreferably accompanied on the way of a polymerization reaction. If the amount for use of the mercaptan tan exceeds 1.0 part by weight, a polymer containing only a small amount of high molecular weight components is unpreferably produced.

The mercaptan used in the present invention is not especially limited as far as it is an organic compound having a SH group, however, preferable ones are alkyl mercaptans such as ethyl mercaptan, butyl mercaptan, hexyl mercaptan and dodecyl mercaptan; thiophenols such as phenyl mercaptan; benzyl mercaptan; mercaptans having a carboxyl group such as thioglycolic acid, 3-mercaptopropionic acid and thiosalicylic acid; esters between alcohols of $C_1$ to $C_{18}$ and mercaptans having a carboxyl group, such as, 2-ethylhexyl thioglycolate; mercaptans having a hydroxyl group such as 2-mercaptoethanol; diesters between diols, such as ethylene glycol and 1,4-butanediol, and mercaptans having a carboxyl group; polyesters between compounds having three or more of hydroxyl groups, such as trimethylolpropane, pentaerythrytol and the like, and mercaptans having a carboxyl group; compounds having three or more of mercapto groups such as trithioglycerol and the like; compounds obtained by adding hydrogen sulfide to polyvalent epoxy compounds; esters between polyvalent carboxylic acids and metcaptoethanol; 2-mercaptobenzothiazole; 2-mercaptobenzimidazole; and so forth. At least one member among these compounds is used.

A mercaptan used for producing an acrylic polymer for acrylic rubber is preferably a compound having three or more of mercapto groups. If a mercaptan of this type is used, an acrylic polymer having a high molecular weight, a narrow molecular weight distribution (Mw/Mn) and a branching structure is produced and acrylic rubber having high strength can be obtained. A mercaptan used for producing an acrylic polymer for a pressure-sensitive adhesive is preferably a compound having three or more of mercapto groups. If a mercaptan of this type is used, an acrylic polymer having a high molecular weight, a narrow molecular weight distribution (Mw/Mn), and a branching structure is produced and a pressure-sensitive adhesive having high cohesion can be obtained.

A disulfide compound used in the present invention is a disulfide compound of the above-mentioned mercaptan (mercapto compound), and its practical examples are dialkyl disulfides such as dimethyl disulfide, diethyl disulfide, dibutyl disulfide and methyl ethyl disulfide; disulfides containing an aromatic ring such as diphenyl disulfide and di(phenylmethyl) disulfide; and the like. At lease one among these compounds is used.

Preferable examples of a thiuram compound used in the present invention are tetramethylthiuram monosulfide, tetramethylthiuram disulfide, tetraethylthiuram monosulfide, tetraethylthiuram disulfide, tetrabutylthiuram monosulfide, tetrabutyl thiuram disulfide, dimethyldiphenylthiuram monosulfide, dimethyldiphenylthiuram disulfide, dipentamethylenethiuram monosulfide, dipentamethylenethiuram disulfide and the like. At least one among these compounds is used.

Preferable examples of a trisulfide compound used in the present invention are dialkyl trisulfides such as dimethyl trisulfide, diethyl trisulfide and dibutyl trisulfide; trisulfides containing an aromatic ring such as diphenyl trisulfide and di(phenylmethyl) trisulfide; and the like. At least one among these compounds is used.

In the present invention, furthermore, it is necessary to carry out a bulk polymerization reaction in the presence of an inactive gas and, by doing like this, it becomes possible to prevent the coloring of a polymer and to control heat generation more easily than the case of a polymerization reaction in the presence of oxygen.

Here, the inactive gas means a gas which does not affect a radical polymerization reaction and its examples are a nitrogen gas, an argon gas and the like.

A monomer component used in the bulk polymerization reaction to obtain an acrylic polymer for acrylic rubber or for a pressure sensitive adhesive comprises at least an acrylic acid-based monomer (A) selected from this monomer (A) and another monomer (B) copolymerizable with the monomer (A). A monomer component used in the present invention comprises an acrylic acid-based monomer (A) as a main component and usually comprises 51 to 100% by weight of the monomer (A) and a balance of the monomer (B), and a monomer component containing at least one selected from the undermentioned monomers (A-1) and (B-1) in proportion of 0.05 to 10% by weight is used.

In a case of producing an acrylic polymer used for acrylic rubber, a monomer component containing at least one selected from the monomers (A-1) and (B-1) in proportion of 0.1 to 10% by weight is used. If the proportion of at least one selected from the monomers (A-1) and (B-1) is less than 0.1% by weight, strength of acrylic rubber obtained is inferior and, if the proportion exceeds 10% by weight, a scorch time is too short or elongation of the rubber is too small.

In a case of producing an acrylic polymer used for a pressure-sensitive adhesive, a monomer component containing at least one selected from the monomers (A-1) and (B-1) in proportion of 0.05 to 10% by weight is used. If the proportion of at least one selected from the monomers (A-1) and (B-1) is less than 0.05% by weight, cohesion and adhesion of an obtained pressure-sensitive adhesive deteriorate and, if the proportion exceeds 10% by weight, initial adhesion (tack) deteriorates unpreferably.

In a case of carrying out the bulk polymerization of monomer component, if the proportion of the monomer (A) is less than 51% by weight, a polymer can be obtained safely and stably, even if a process of the present invention is not applied. However, in a case where the proportion of the monomer (A) exceeds 51% by weight, the bulk polymerization is difficult unless a process of the present invention is applied. In a case of producing an acrylic polymer for acrylic rubber, the undermentioned monomer (A-2) is used in a proportion of 51% by weight or more, preferably 60% by weight or more, in order to maintain a glass transition temperature of acrylic rubber at a low level. In a case of producing an acrylic polymer for a pressure-sensitive adhesive composition, the monomer (A-2) is used in a proportion of 51% by weight or more, preferably 60% by weight or more, in order to maintain a glass transition temperature of the adhesive at a low level.

A monomer component used in a bulk polymerization reaction to obtain an acrylic polymer of high acid value such as 65 mg/g or higher consists of 10 to 100% by weight of (meth)acrylic acid (C) and a balance of another monomer (D) copolymerizable with the (C). If the amount of the monomer (C) is smaller than 10% by weight, the polymer is not practically soluble in an alkali. The monomer (C) is either one or both of acrylic acid and methacrylic acid, and may include a salt thereof.

Practical examples of the monomer (D) are:

alkyl (meth)acrylates of $C_1$ to $C_{20}$ and substituted compounds thereof, such as, methyl (meth)acrylate, ethyl (meth)acrylate, propyl (meth)acrylate, butyl (meth)acrylate, pentyl (meth)acrylate, hexyl (meth)acrylate, octyl (meth)acrylate, nonyl (meth)acrylate, decyl (meth)acrylate and dodecyl (meth) acrylate;

aryl (meth)acrylates such as phenyl (meth)acrylate and benzyl (meth)acrylate;

alkoxyalkyl (meth)acrylates such as methoxyethyl (meth)acrylate, ethoxyethyl (meth)acrylate, butoxyethyl (meth)acrylate and ethoxypropyl (meth)acrylate;

(meth)acrylates of oxyalkylene adducts of alcohols, such as, ethoxydiethylene glycol (meth)acrylate, phenoxydiethylene glycol (meth)acrylate, phenoxypolyethylene glycol (meth)acrylate, (meth)acrylate of ethylene oxide (EO) adduct of nonylphenol, and (meth)acrylate of propylene oxide (PO) adduct of nonylphenol;

mono(meth)acrylates or di(meth)acrylates of polyalkylene glycols such as polyethylene glycol, such as ethylene glycol, diethylene glycol, triethylene glycol and the like, and polypropylene glycol and the like;

(meth)acrylates of alicyclic alcohols, such as, cyclohexyl (meth)acrylate;

aromatic vinyl monomers such as styrene, vinyltoluene, α-methylstyrene, vinylnaphthalene and styrene halide;

vinyl monomers containing a carboxyl group, such as, unsaturated monocarboxylic acids ((meth)acrylic acid is excluded) such as itaconic acid and salts thereof, unsaturated dicarboxylic acids such as crotonic acid, maleic acid and fumaric acid or half ester compounds thereof, and the like;

vinyl monomers containing an amide group, such as, methacrylamide, N-methylolmethacrylamide, N-methoxymethylmethacrylamide and N-butoxymethylmethacrylamide;

vinyl acetate, vinyl chloride, vinylidene chloride, (meth)acrylonitrile and so forth. At least one among the above-mentioned compounds is used.

An acrylic acid-based monomer (A) has a $CH_2=CHCO-$ structure except methacrylic acid and salts thereof. An acrylic acid-based monomer (A) is selected from a monomer (A-1) having a crosslinkable functional group and a monomer (A-2) not having the crosslinkable functional group.

The monomer (A-1) has at least one crosslinkable functional group selected from an oxazoline, an aziridine, an epoxy, a hydroxyl, a carboxyl, a reactive halogen, an amide, and an organic silicon group. A practical example of the monomer (A-1) is at least one member selected from aziridine group-containing monomers such as acryloyl aziridine and 2-aziridinylethyl acrylate; epoxy group-containing monomers such as glycidyl acrylate and 2-methylglycidyl acrylate; hydroxyl group-containing monomers such as 2-hydroxyethyl acrylate, 2-hydroxypropyl acrylate, monoesters of acrylic acid with polypropylene glycol or polyethylene glycol, and addition products between lactones and 2-hydroxyethyl acrylate; carboxyl group-containing monomers such as esters of acrylic acid with compounds having both of a hydroxyl group and a carboxyl group, acrylic acid, methacrylic acid, acrylic acid salts and methacrylic acid salts; reactive halogen-containing monomers such as 2-chloroethyl acrylate; amide group-containing monomers such as acrylamide, N-methylolacrylamide, N-methoxymethylacrylamide and N-butoxymethylacrylamide; organic silicon group-containing monomers such as γ-acryloxypropyltrimethoxysilane and 2-acrylo xyethoxytrimethoxysilane.

The monomer (A-2) does not have the above-mentioned crosslinkable functional group. Practical examples of the monomer (A-2) are acrylic acid alkylesters and substituted compounds thereof such as methyl acrylate, ethyl acrylate, propyl acrylate, butyl acrylate, pentyl acrylate, hexyl acrylate, 2-ethylhexyl acrylate, octyl acrylate, nonyl acrylate, decyl acrylate and dodecyl acrylate; acrylic acid arylesters such as phenyl acrylate and benzyl acrylate; acrylic acid alkoxyalkylesters such as methoxyethyl acrylate, ethoxyethyl acrylate, butoxyethyl acrylate and ethoxypropyl acrylate; diacrylic acid esters of polyethylene glycol such as ethylene glycol, diethylene glycol, triethylene glycol and the like; diacrylic acid esters of polypropylene glycol such as propylene glycol, dipropylene glycol, tripropylene glycol and the like; polyvalent acrylic acid esters such as trimethylolpropane triacrylate and so forth; acrylic acid esters of alicyclic alcohols such as cyclohexyl acrylate; and so forth. At least one member among these compounds is used.

The monomer (B) is another monomer copolymerizable with the acrylic acid-based monomer (A) and is at least one member selected from a monomer (B-1) having a crosslinkable functional group and a monomer (B-2) not having the crosslinkable functional group. The monomer (B-1) is used to functionate it as a crosslinking point when molding by a thermal press or adhesion processing is carried out. The monomer (B-2) is, as occasion demands, used in a case of using an acrylic polymer for the acrylic rubber or pressure-sensitive adhesive, in a range where inherent properties of acrylic rubber such as heat resistance, oil resistance and so forth or inherent properties of a pressure-sensitive adhesive such as tackiness and so forth are not damaged.

The monomer (B-1) has both of a polymerizable double bond group and at least one crosslinkable functional group selected from an oxazoline, an aziridine, an epoxy, a hydroxyl, a carboxyl, a reactive halogen, an amide and an organic silicone group, and a reactive double bond group. Practical examples of the monomer (B-1) are oxazoline group-containing polymerizable monomers such as 2-vinyl-2-oxazoline, 2-vinyl-5-methyl-2-oxazoline and 2-isopropenyl-2-oxazoline; aziridine group-containing polymerizable monomers such as methacryloylaziridine and 2-aziridinylethyl methacrylate; epoxy group-containing vinyl monomers such as allyl glycidyl ether, glycidyl methacrylate and 2-methylglycidyl methacrylate; hydroxyl group-containing polymerizable monomers such as 2-hydroxyethyl methacrylate, 2-hydroxypropyl methacrylate, monoesters of methacrylic acid with polypropylene glycol or polyethylene glycol, and addition products between lactones and 2-hydroxyethyl methacrylate; carboxyl group-containing vinyl monomers such as unsaturated monocarboxylic acids (acrylic acid and methacrylic acid are excluded) like itaconic acid and salts thereof, unsaturated dicarboxylic acids like crotonic acid, maleic acid and fumaric acid and half esters thereof, and the like; reactive halogen-containing vinyl monomers such as 2-chloroethyl vinyl ether and vinyl monochloroacetate; amide group-containing vinyl monomers such as methacrylamide, N-methylolmethacrylamide, N-methoxymethylmethacrylamide and N-butoxymethylmethacrylamide; organic silicon group-containing unsaturated monomers such as vinyl trimethoxysilane, γ-methacryloxypropyltrimethoxysilane, allyltriethoxysilane, trimethoxysilylpropylallylamine and 2-methacryloxyethoxytrimethoxysilane; ethylidene norbornene, piperirene, isoprene, pentadiene, vinylcyclohexene, chloroprene, butadiene, methylbutadiene, cyclopentadiene and methylpentadiene. At least one member among these compounds is used.

The monomer (B-2) does not have the above-mentioned crosslinkable functional group. Practical examples of the monomer (B-2) are aromatic vinyl monomers such as styrene, vinyl toluene, α-methylstyrene, vinylnaphthalene and halogenated styrene; acrylonitrile; methacrylonitrile; vinyl acetate; vinyl chloride; vinylidene chloride; methacrylic acid esters of alicyclic alcohols such as cyclohexyl methacrylate; methacrylic acid esters of aromatic alcohols such as benzyl methacrylate; methacrylic acid esters such as methacrylic acid alkylesters and methacrylic acid alkoxyalkylesters; and so forth. At least one member among these compounds is used.

In the present invention, an additive other than the polymerizable monomer component, for example, a solvent or the like may be added in a small amount to such an extent as not practically affecting the bulk polymerization. However, in carrying out the bulk polymerization, it is permitted that a polymerization system contains practically no general radical polymerization initiator such as an azo-based initiator, a peroxide and so forth, or that the polymerization system contains the polymerization initiator in proportion by weight of one-third or less based on the weight of a sulfur compound. Here, to contain practically no polymerization initiator means either to contain no polymerization initiator at all, or to contain a polymerization initiator in an amount smaller than the amount, with which a sulfur compound does not display the aforementioned role and a rapid and intensive reaction occurs. In a case of using a radical polymerization initiator in proportion by weight more than one-third based on the weight of a sulfur compound, it becomes difficult to control a polymerization reaction, so that it becomes difficult to design molecular weight and its distribution of a polymer, and products gelated (gelled) or deteriorated are formed due to the rapid and intensive exothermic polymerization or, in the worst case, explosion occurs.

In the present invention, the bulk polymerization reaction can be carried out using a polymerization apparatus hitherto known in public. For example, there can be cited a perfect mixing type reaction vessel such as a kneader, a tank type reaction vessel equipped with stirring wings of various types; a piston flow type reaction vessel having a driving part such as an extruder; a piston flow type reaction vessel having no driving part for stirring a liquid by an obstacle, such as a static mixer; and so forth. The bulk polymerization can be carried out in a batch manner or a continuous manner by using said apparatus alone or in combination of two kinds or more. For example, the tank type reaction vessel is combined with the piston flow type reaction vessel, a monomer component is preliminarily polymerized in the tank type reaction vessel and then the preliminarily polymerized product obtained is passed through the piston flow type reaction vessel, so that the bulk polymerization can be carried out in a continuous manner without a runaway reaction and with good productivity at a low cost. Especially, because the reaction is sufficiently mild in a production process of the present invention, it is an outstanding characteristic that the bulk polymerization can be carried out even by using a tank type reaction vessel having a small cooled surface area per an unit volume and large capacity. Conditions of stirring a reaction mixture in carrying out the bulk polymerization by the present invention can be set similarly to the case of the conventional bulk polymerization.

The polymerization temperature is preferably in range of from 60° to 200° C., more preferably in a range of from 100° to 150° C. If the temperature lower than 60° C., the polymerization is rate is slow and this not industrially practical. If the temperature exceeds 200° C., the polymerization rate becomes too fast and control becomes difficult.

According to the present invention, an acrylic polymer can be obtained by carrying out a bulk polymerization reaction of a monomer component comprising at least acrylic acid-based monomer (A) selected from the monomer (A) and another monomer (B) up to high polymerization conversion or up to 100% polymerization conversion. Taking productivity into consideration, even in a case of removing volatile components from a reaction solution under reduced pressure after the bulk polymerization being carried out, it is preferable to elevate polymerization conversion up to 60% or higher, more preferably 80% or higher. In order to produce an acrylic polymer for acrylic rubber having high strength and an acrylic polymer for a pressure-sensitive adhesive having high removability, because to obtain a polymer having a high molecular weight and a narrow molecular weight distribution is required, it is preferable to cease the polymerization in the polymerization conversion of from 60 to 90% and then remove volatile components.

In a case of carrying out the polymerization reaction up to polymerization conversion of 100%, a produced acrylic polymer is obtained by taking a reaction solution out of a reaction vessel as it is, and in a case of stopping the polymerization on the way, the polymer is obtained by removing volatile components from the reaction solution under reduced pressure.

An acrylic polymer obtained in the above-mentioned manner according to the process of present invention has a molecular weight distribution (Mw/Mn) of from 1.5 to 7 and a number-average molecular weight of from 1,000 to 4,000,000 which are based on a molecular weight in terms of polystyrene, although these values depends upon the monomer composition. An acrylic polymer of optional molecular weight can be obtained safely and stably by varying the kind or amount of a sulfur compound and the polymerization temperature. This polymer is composed of at least acrylic acid-based monomer unit (a) selected from this monomer unit (a) derived from the monomer (A) and another monomer unit (b) derived from the monomer (B) and the polymer has a structure in which these monomer units have combined regularly or irregularly. The monomer unit (a) is at least one member selected from a crosslinkable acrylic acid-based monomer unit (a-1), which is derived from the monomer (A-1) and has a crosslinkable functional group, and a crosslinkless acrylic acid-based monomer unit (a-2) which is derived from the monomer (A-2) and does not have a crosslinkable functional group. The monomer unit (b) is at least one member selected from another monomer unit (b-1), which is derived from the monomer (B-1) and has a crosslinkable functional group, and another monomer unit (b-2) which is derived from the monomer (B-2) and does not have a crosslinkable functional group. A homopolymer of an acrylic acid-based monomer (A) is also included in an acrylic polymer obtained by the present invention.

An obtained acrylic polymer is effectively used in all of the uses for conventional acrylic polymers, for example, it is used for acrylic rubber, a pressure-sensitive adhesive, an alkali-soluble adhesive, an alkali-soluble film, an alkali-soluble injection molding, water ink, a coating, a low profile agent, a dispersing agent, a fiber-processing agent, a sealing agent, a vibration-controlling agent, an asphalt additive, a resin improver and so forth.

An acrylic polymer obtained by using a monomer component containing 10 to 100% by weight of (meth)acrylic acid has an acid value of 65 mg/g or higher, preferably from 100 to 500 mg/g. If the acid value is lower than 65 mg/g, the polymer is not practically soluble in an alkali and, if the acid value higher than 500 mg/g, the polymer is excessively hydrophilic, so that the polymer may not display satisfying performance in the common use such as ink, floor polish, coating of paper, paint, an adhesive and a molding material.

The acrylic polymer obtained by using a monomer component containing 10 to 100% by weight of (meth)acrylic acid has such a high acid value as mentioned above and is soluble in an alkali. In addition, because the polymer is synthesized by a bulk polymerization reaction, it does not contain a dispersion medium, an emulsifier, a dispersing agent and so forth. Therefore, this acrylic polymer is effectively used in all of the uses for conventional acrylic polymers of high acid value, for example, it is used for binder of ink, floor polish, paint, an adhesive, a pressure-sensitive adhesive, a molding material, a film, a label and so forth.

Furthermore, the above-mentioned acrylic polymer of present invention as well as the above-mentioned acrylic polymers of present invention used for acrylic rubber, a pressure-sensitive adhesive, an alkali-soluble adhesive, an alkali-soluble film, an alkali-soluble injection molding and water ink can be obtained effectively by a process of the present invention for producing an acrylic polymer, however, the polymers can be obtained not only by this process but also by other processes.

An acrylic polymer of the present invention is obtained by the bulk polymerization reaction, contains an acrylic acid-based monomer unit (a) as a main component in its structure and has a number-average molecular weight in a range of from 1,000 to 1,000,000, a glass transition temperature of $-80°$ C. or higher and a molecular weight distribution (Mw/Mn) of 5 or less, so that this polymer contains no surfactant, has only a little limitation in the polymer composition, contains a large amount of a component near an average molecular weight, is small in amounts of both components having molecular weight lower and higher than the average, and is superior in heat resistance, processing operation performance and fluidity.

An acrylic polymer of the present invention used for acrylic rubber, in the above-mentioned acrylic polymer of the present invention, contains an acrylic acid-based monomer unit (a) in proportion of from 60 to 100% by weight and a crosslinkable functional group in proportion of from 0.01 to 1.4 mmol/g in its structure and has a number-average molecular weight in a range of from 200,000 to 1,000,000, a glass transition temperature in a range of from $-80°$ to $0°$ C. and a molecular weight distribution of 3 or less. Therefore, this polymer has good balance between operation performance and strength and is preferred to make superior acrylic rubber.

An acrylic polymer relating to the present invention used for a pressure-sensitive adhesive, in the above-mentioned acrylic polymer of the present invention, contains an acrylic acid-based monomer unit (a) in proportion of from 60 to 100% by weight and a crosslinkable functional group in proportion of from 0.005 to 1.4 mmol/g in its structure and has a number-average molecular weight in a range of from 10,000 to 500,000 and a glass transition temperature in a range of from $-80°$ to $-30°$ C. Therefore, this polymer has an advantage of being superior in cohesion, water resistance, heat resistance and removability and is preferred to make a superior pressure-sensitive adhesive.

An acrylic polymer of the present invention used for an alkali-soluble adhesive, in the above-mentioned acrylic polymer of the present invention, contains an acrylic acid-based monomer unit (a) in proportion of from 50 to 100% by weight in its structure and has an acid value of 65 mg/g higher, a number-average molecular weight in a range of from 5,000 to 200,000, a glass transition temperature of $0°$ C. or higher and a molecular weight distribution of 3 or less. Therefore, this polymer has good balance between adhesive strength, especially, heat-resistant adhesive strength and fluid properties as a hot melt adhesive, and is preferred to make a superior alkali-soluble adhesive.

An acrylic polymer of the present invention used for an alkali-soluble film, in the above-mentioned acrylic polymer of the present invention, contains an acrylic acid-based monomer unit (a) in proportion of from 60 to 100% by weight in its structure and has an acid value of 65 mg/g or higher, a number-average molecular weight in a range of from 10,000 to 500,000, a glass transition temperature of $0°$ C. or higher and a molecular weight distribution of 4 or less. Therefore, this polymer has good balance of film strength with blocking resistance and molding performance, and is preferred to make a superior alkali-soluble film.

An acrylic polymer of the present invention used for an alkali-soluble injection molding, in the above-mentioned acrylic polymer of the present invention, contains an acrylic acid-based monomer unit (a) in proportion of from 60 to 100% by weight in its structure and has an acid value of 65 mg/g or higher, a number-average molecular weight in a range of from 5,000 to 200,000, a glass transition temperature of 70° C. or higher and a molecular weight distribution of 4 or less. Therefore, this polymer has good balance of strength and molding performance with alkali-solubility, and is preferred to make a superior alkali-soluble injection molding.

An acrylic polymer of the present invention used for water ink, in the above-mentioned acrylic polymer of the present invention, contains an acrylic acid-based monomer unit (a) in proportion of from 50 to 100% by weight in its structure and has an acid value of 65 mg/g or higher, a number-average molecular weight in a range of from 1,000 to 50,000, a glass transition temperature of 30° C. or higher and a molecular weight distribution of 3 or less. Therefore, this polymer has good balance between durability of the printed matter and printability, and is preferred to make superior water ink.

According to the production process of present invention, there is carried out the bulk polymerization of a starting material for polymerization which contains a monomer component comprising an acrylic acid-based monomer as a main component, contains a sulfur compound in proportion of from 0.001 to 20 parts by weight based on 100 parts by weight of the total of said monomer component, and contains a polymerization initiator in proportion by weight of one-third or less based on the weight of said sulfur compound. Therefore, rapid and intensive heat generation in the course of polymerization is suppressed and polymerization rate becomes mild. Furthermore, because the above-mentioned bulk polymerization is carried out in the presence of an inactive gas, danger of explosion is decreased and coloring of a polymer becomes little. Accordingly, the bulk polymerization is carried out safely and stably up to high polymerization conversion, and in addition, an acrylic polymer, which is colored little and has a narrow molecular weight distribution, is produced with good productivity.

Because an acrylic polymer of the present invention contains no surfactant, has little limitation in the polymer composition and is superior in heat resistance, processing operation performance and fluidity, this polymer is appropriate for the uses of acrylic rubber, a pressure-sensitive adhesive, an alkali-soluble adhesive, an alkali-soluble film, an alkali-soluble injection molding, water ink, a coating, a low profile agent, a dispersing agent, a fiber-processing agent, a sealing agent, a vibration-controlling material, a resin improver, an asphalt additive and so forth.

An acrylic polymer of the present invention for acrylic rubber has good balance between the processing operation performance and strength. If this polymer is used, acrylic rubber superior in the molding performance, strength and water resistance and having little tackiness can be made. If an acrylic polymer of the present invention for a pressure-sensitive adhesive is used, there can be made a pressure-sensitive adhesive which is superior in cohesion, water resistance and heat resistance and solves adhesive transfer in removing and so forth. If an acrylic polymer of the present invention for an alkali-soluble adhesive is used, there can be made an alkali-soluble adhesive which is superior in balance between adhesive strength, especially, heat-resistant adhesive strength and hot melt properties, and also superior in properties as a hot melt adhesive. If an acrylic polymer of present invention for an alkali-soluble film is used, there can be made an alkali-soluble film which is superior in film strength and blocking resistance and has good molding performance. If an acrylic polymer of present invention for an alkali-soluble injection molding is used, there can be made an alkali-soluble injection molding which is superior in balance between strength and alkali-solubility and has good molding performance. If an acrylic polymer of present invention for water ink is used, there can be made water ink which is superior in printability and excellent in durability of the printed matter.

According to a production process of the present invention, an acrylic polymer which contains neither an emulsifier nor a dispersing agent, is colored little and has a narrow molecular weight distribution can be produced safely and stably with good productivity on an industrial scale. In a case of carrying out a copolymerization reaction, because the composition of a monomer mixture is not limited, an acrylic polymer having the desired composition is obtained.

Special apparatuses have been proposed to control rapid and intensive heat generation in the conventional bulk polymerization reactions to obtain an acrylic polymer. However, according to the production process of present invention, an acrylic polymer can be easily produced by the bulk polymerization even by a common reaction apparatus and the process is an industrially very significant process in view of safety.

An acrylic polymer obtained by the production process of present invention, because of its transparency and narrow molecular weight distribution, is very useful, for example, for the use in which a component of high molecular weight displays essential performance and a component of low molecular weight causes lowering of the performance, or for the use in the converse case.

DESCRIPTION OF THE PREFERRED EMBODIMENTS

Hereinafter, the present invention is illustrated by the following examples of some preferred embodiments in comparison with comparative examples not according to the invention. However, the present invention is not limited to the undermentioned examples. Hereinafter, the term "part(s) by weight" is referred to as "part(s)" and the term "% by weight" as "%".

EXAMPLE α-1

Into a flask equipped with a stirrer, nitrogen-introducing tube, thermometer and reflux condenser, were charged 650 parts of butyl acrylate, 650 parts of ethyl acrylate, 100 parts of styrene, 100 parts of glycidyl methacrylate and 6 parts of trimethylolpropane trithioglycolate, and these were stirred. A polymerization reaction was carried out by heating this mixture up to 120° C. with stirring while introducing a nitrogen gas into the mixture slowly. Heating and cooling were carried out by raising and lowering the temperature of an oil bath in which said flask was put. Thereby the polymerization reaction proceeded at a constant temperature of 120° C. and could be carried out safely and stably. The polymerization reaction was continued for 4 hours and then a reaction mixture was cooled. For the resultant acrylic polymer, the polymerization conversion was 91.1% and the analysis value in terms of polystyrene by gel permeation chromatography (GPC) (hereinafter, molecular weight measurements were carried out similarly) gave a number-average molecular weight (Mn) of 105,000, a weight-average molecular weight (Mw) of 322,000 and a Mw/Mn ratio of 3.1. The reaction mixture containing this polymer was continuously supplied to a twin screw extruder and devolatilized under reduced pressure by heating it at 200° C. Thereby the polymer could be isolated as a 100% polymer.

COMPARATIVE EXAMPLE α-1

A mixed solution of starting materials was prepared by dissolving 650 parts of butyl acrylate, 650 parts of ethyl acrylate, 100 parts of styrene, 100 parts of glycidyl methacrylate and 10 parts of azobis (isobutyronitrile) into 1500 parts of ethyl acetate. Into a flask equipped with a stirrer, nitrogen-introducing tube, dropping funnel, thermometer and reflux condenser, was charged a half amount of the mixed solution, which was then heated up to 80° C. with stirring while introducing a nitrogen gas into the solution slowly, and to which a residual amount of the mixed solution was added dropwise during 2 hours, and the reaction mixture was aged for further 1.5 hours to complete the polymerization reaction. After completion of the reaction, the mixture was adjusted to 30% solid content by using ethyl acetate. An obtained acrylic polymer had a number-average molecular weight (Mn) of 45,000, a weight-average molecular weight (Mw) of 385,000 and a Mw/Mn ratio of 8.5, so that the molecular weight distribution was very broad.

COMPARATIVE EXAMPLE α-2

The procedure of EXAMPLE α-1 was repeated except that 0.15 parts of lauryl peroxide, which is a polymerization initiator, was used instead of 6 parts of trimethylolpropane trithioglycolate which is a mercaptan. In this case, the reaction temperature could not be maintained at a constant condition on the way of polymerization of 4 hours and rose up to 160° C., so that the polymerization could not be carried out under a stable condition. This suggests that danger of explosion owing to a rapid and intensive reaction is comprised on an industrial production scale.

COMPARATIVE EXAMPLE α-3

The procedure of EXAMPLE α-1 was repeated except that 6 parts of trimethylolpropane trithioglycolate which is a mercaptan was not charged. In this case, the reaction temperature rose up to 130° C. on the way of polymerization of 4 hours and the polymerization could not be carried out under a stable condition. Also, an obtained polymer was a gelated (gelled) product. This case also suggests danger of explosion owing to a rapid and intensive reaction on an industrial production scale.

COMPARATIVE EXAMPLE α-4

Into a apparatus and a polymerizable monomer mixture similar to those in EXAMPLE α-1, was charged 10 parts of azobis(cyclohexanecarbonitrile), which is a polymerization initiator, and a polymerization reaction was carried out at 80° C. while introducing a nitrogen gas into the monomer mixture slowly. After one hour, because it became impossible to maintain a constant temperature in an inside of the flask, the temperature was maintained as constant by continuously taking a reaction mixture out of a lower part of the flask at the rate of 1000 parts per hour, by beginning introducing the mixture into a KRC kneader (a self-cleaning continuous type of kneader made by Kurimoto Tekkosho Co., Ltd.) as well as by adding a monomer mixture of the same composition as the above-mentioned into the flask dropwise at the same rate as the above. Although a polymerization reaction was carried out i n the KRC kneader for 1.5 hours, the temperature at an inlet part of the kneader was 80° C., whereas the temperature near an outlet of the kneader was 150° C., so that temperature-rise in the kneader was recognized. The resultant acrylic polymer had polymerization conversion of 96.0%, Mn of 21,000, Mw of 225,000, and Mw/Mn ratio of 10.7. This polymer was isolated as a 100% polymer from a solution containing the polymer in a manner similar to EXAMPLE α-1. The obtained acrylic polymer, 100 parts, was added to 1000 parts of tetrahydrofuran and, although stirring was sufficiently carried out in order to dissolve the polymer in to the tetrahydrofuran, insoluble portions were recognized and a homogeneous solution was not obtained.

That is, as in COMPARATIVE EXAMPLE α-4, if 10 parts of azobis(cyclohexanecarbonitrile), which is a polymerization initiator, and 6 parts of trimethylolpropane trithioglycolate, which is a mercaptan, are charged into a monomer mixture, a monomer mixture of low temperature for dropping must be added dropwise to maintain an inside temperature of a flask as constant and a polymerization reaction proceeds on delicate balance, so that this procedure is not preferable as an industrial process in view of safety and, furthermore, gel portions are produced in a reaction solution.

EXAMPLE α-2

An apparatus similar to that in COMPARATIVE EXAMPLE α-4 (combination of a flask type reaction vessel and a KRC kneader) was used. A monomer mixture comprising 650 parts of butyl acrylate, 650 parts of methoxyethyl acrylate, 170 parts of ethyl acrylate, 30 parts of glycidyl methacrylate and 7.5 parts of 2-mercaptobenzothiazole was charged into a flask and the mixture obtained was heated up to 120° C. with stirring while introducing a nitrogen gas into the mixture slowly. When a polymerization reaction was continued for 1.5 hours at the temperature, a polymerization intermediate was continuously taken out of a lower part of the flask at the rate of 1000 parts per hour and introduced into the KRC kneader, and the polymerization reaction was further continued at 110° C. for one hour. Into the flask, was supplied a monomer mixture of the same composition as the above-mentioned at the rate of 1000 parts per hour in a manner similar to COMPARATIVE EXAMPLE α-4 and the polymerization reaction was continuously advanced. This reaction could be carried out under stable conditions during polymerization. The resultant macromolecular acrylic polymer (I) for acrylic rubber had polymerization conversion of 90.0%, Mn of 311,000, Mw of 666,000 and Mw/Mn ratio of 2.1. A solution containing this polymer was continuously supplied to a twin screw extruder and devolatilized under a reduced pressure. Thereby said polymer was isolated as a 100% polymer.

The composition of monomer units constituting the obtained macromolecular acrylic polymer (I) for acrylic rubber was measured by a method comprising hydrolyzing this polymer and then quantitatively analyzing a produced alcohol by gas chromatography, and by carrying out the H-NMR spectroscopy, elemental analysis, measurement of the acid value and so forth. As a result, the polymer (I) had a structure comprising 12.4% of an ethyl acrylate unit, 43.0% of a butyl acrylate unit, 43.0% of a methoxyethyl acrylate unit and 1.6% of a glycidyl methacrylate unit.

EXAMPLE α-3

The procedure o f EXAMPLE α-2 was repeated except that a monomer unit of the composition shown in Table α-1 was used and that the polymerization tempera lure was 100° C. Thereby a macromolecular acrylic polymer (II) for acrylic rubber was obtained as a 100% polymer. The polymerization reaction was mild and stable similarly to the case of EXAMPLE α-2.

EXAMPLES α-4 to α-9

The procedure of EXAMPLE α-3 was repeated except that monomer mixtures of the composition shown in Table α-1 were used. Thereby macromolecular acrylic polymers (III) to (VIII) for acrylic rubber were obtained as 100% polymers. The polymerization reaction was mild and stable similarly to the case of EXAMPLE α-2.

(COMPARATIVE EXAMPLE α-5

A pre-emulsion was prepared by shaking with stirring 170 parts of ethyl acrylate, 650 parts of butyl acrylate, 650 parts of methoxyethyl acrylate, 30 parts of glycidyl methacrylate and 750 parts of a 3% aqueous solution of sodium dodecylsulfate in a dropping funnel.

Into a flask equipped with a stirrer, nitrogen-introducing tube, dropping funnel, thermometer and reflux condenser, was charged 1500 parts of ion-exchanged water and the inside atmosphere of the flask was sufficiently displaced by nitrogen gas under stirring conditions while maintaining the liquid temperature at 40° C. Then, a portion of the pre-emulsion prepared beforehand, 112.5 parts, with 3 parts of potassium persulfate and 10 parts of 2% sodium hydrogen sulfite were added to the ion-exchanged water in the flask to initiate a polymerization reaction at 40° C. under stirring conditions. The residual pre-emulsion was added dropwise into the flask during 3 hours and, after completion of the adding, aging was carried out at the same temperature for 1 hour and then a reaction solution (emulsion) containing a produced comparative acrylic polymer (I) was cooled. At every 15 minutes, in the course of polymerization, 10 parts of 2% sodium hydrogen sulfite was added to maintain the solution temperature at 40° C. Resultant emulsion was poured into saturated saline to salt out a polymer. This polymer was rinsed and then dried. Thereby the comparative acrylic polymer (I) was obtained.

COMPARATIVE EXAMPLE α-6

A mixed solution of 170 parts of ethyl acrylate, 650 parts of butyl acrylate, 650 parts of methoxyethyl acrylate, 30 parts of glycidyl methacrylate, 2250 parts of ethyl acetate, 6 parts of azobis(isobutyronitrile) and 3 parts of mercaptoethanol was prepared.

An apparatus similar to that for COMPARATIVE EXAMPLE α-5 was used. Into a flask of which inside atmosphere was displaced by nitrogen gas, was charged a portion of the mixed solution prepared beforehand, 2000 parts, and a polymerization reaction was initiated by heating this solution up to 80° C. The residual mixed solution was added dropwise into the flask during 2 hours. After completion of the adding, aging was carried out at 80° C. for 1 hour and then a reaction liquid (solution) containing a produced comparative acrylic polymer (II) was cooled. This solution containing the polymer was continuously supplied to a twin screw extruder and devolatilized under a reduced pressure by heating it at 180° C. Thereby the comparative acrylic polymer (II) was isolated as a 100% polymer.

For the macromolecular acrylic polymers (I) to (VIII) for acrylic rubber and the comparative polymers (I) and (II), the number-average molecular weight (Mn), weight-average molecular weight (Mw), molecular weight distribution (Mw/Mn), composition of composing units, amount of a crosslinkable functional group and glass transition temperature were shown in Table α-2. To dissolve the comparative acrylic polymer (I) into tetrahydrofuran was attempted for measurement of the molecular weight, but the amount of a gelated (gelled) product (a solid portion) was too large to carry out the measurement.

The glass transition temperature was measured by using differential scanning calorimeter "DSC-7" made by Perkin Elmer Co., Ltd.

The amount of a crosslinkable functional group was measured by a titration method by KOH for the carboxyl group, by an inverse titration method by HCl addition for the epoxy group, by an inverse titration method by addition of anhydrous acetic acid for the hydroxyl group, by an elemental analysis for the halogen (chlorine), and by synthesizing three methods of elemental analysis, IR and NMR for the oxazoline and aziridine groups.

TABLE α-1

| Composition of monomer mixture (parts) | EXAMPLE α-2 | EXAMPLE α-3 | EXAMPLE α-4 | EXAMPLE α-5 | EXAMPLE α-6 |
|---|---|---|---|---|---|
| (A-1) | | | | | |
| Acrylic acid | — | — | — | — | 75 |
| (A-2) | | | | | |
| Ethyl acrylate | 170 | 1455 | 1455 | 1455 | 1425 |
| Butyl acrylate | 650 | — | — | — | — |
| Methoxyethyl acrylate | 650 | — | — | — | — |
| (B-1) | | | | | |
| Glycidyl methacrylate | 30 | — | — | — | — |
| 2-Isopropenyl-2-oxazoline | — | 45 | — | — | — |
| 2-Aziridinylethyl methacrylate | — | — | 45 | — | — |
| 2-Hydroxyethyl methacrylate | — | — | — | 45 | — |
| 2-Chloroethyl vinyl ether | — | — | — | — | — |
| (B-2) | | | | | |

TABLE α-1-continued

| | | | | | |
|---|---|---|---|---|---|
| Acrylonitrile | — | — | — | — | — |
| Styrene | — | — | — | — | — |
| Mercaptan | | | | | |
| 2-Mercaptobenzo-thiazole | 7.5 | — | — | — | — |
| Trimethylolpropane trithioglycolate | — | 3 | — | — | — |
| Dodecylmercaptan | — | — | 1 | — | — |
| 2-Mercaptoethanol | — | — | — | 0.5 | — |
| Trithioglycerol | — | — | — | — | 2 |
| Thioglycolic acid | — | — | — | — | — |
| Polymerization initiator | — | — | — | — | — |

| Composition of monomer mixture (parts) | EXAMPLE α-7 | EXAMPLE α-8 | EXAMPLE α-9 | COMPARATIVE EXAMPLE α-5 | COMPARATIVE EXAMPLE α-6 |
|---|---|---|---|---|---|
| (A-1) | | | | | |
| Acrylic acid | — | — | — | — | — |
| (A-2) | | | | | |
| Ethyl acrylate | 1455 | 650 | 650 | 170 | 170 |
| Butyl acrylate | — | 650 | 650 | 650 | 650 |
| Methoxyethyl acrylate | — | — | — | 650 | 650 |
| (B-1) | | | | | |
| Glycidyl methacrylate | — | 30 | 30 | 30 | 30 |
| 2-Isopropenyl-2-oxazoline | — | — | — | — | — |
| 2-Aziridinylethyl methacrylate | — | — | — | — | — |
| 2-Hydroxyethyl methacrylate | — | — | — | — | — |
| 2-Chloroethyl vinyl ether | 45 | — | — | — | — |
| (B-2) | | | | | |
| Acrylonitrile | — | 170 | — | — | — |
| Styrene | — | — | 170 | — | — |
| Mercaptan | | | | | |
| 2-Mercaptobenz-thiazol | — | 7.5 | — | — | — |
| Trimethylolpropane trithioglycolate | — | — | 3 | — | — |
| Dodecylmercaptan | — | — | — | — | — |
| 2-Mercaptoethanol | — | — | — | — | 3 |
| Trithioglycerol | — | — | — | — | — |
| Thioglycolic acid | 1 | — | — | — | — |
| Polymerization initiator | — | — | — | Potassium persulfate 3 | azobis (isobutyronitrile) 6 |

TABLE α-2

| Composition of composing unit (%) | EXAMPLE α-2 | EXAMPLE α-3 | EXAMPLE α-4 | EXAMPLE α-5 | EXAMPLE α-6 |
|---|---|---|---|---|---|
| (a-1) | | | | | |
| Acrylic acid | — | — | — | — | 5.5 |
| (a-2) | | | | | |
| Ethyl acrylate | 12.4 | 97.3 | 97.2 | 96.9 | 94.5 |
| Butyl acrylate | 43.0 | — | — | — | — |
| Methoxyethyl acrylate | 43.0 | — | — | — | — |
| (b-1) | | | | | |
| Glycidyl methacrylate | 1.6 | — | — | — | — |

TABLE α-2-continued

| | | | | | |
|---|---|---|---|---|---|
| 2-Isopropenyl-2-oxazoline | — | 2.7 | — | — | — |
| 2-Aziridinylethyl methacrylate | — | — | 2.8 | — | — |
| 2-Hydroxyethyl methacrylate | — | — | — | 3.1 | — |
| 2-Chloroethyl vinyl ether | — | — | — | — | — |
| (b-2) | | | | | |
| Acrylonitrile | — | — | — | — | — |
| Styrene | — | — | — | — | — |
| Polymer | | | | | |
| Polymerization conversion % | 90.0 | 85.5 | 88.1 | 91.2 | 94.5 |
| Number-average molecular weight (Mn)/10$^4$ | 31.1 | 42.4 | 18.2 | 25.8 | 33.3 |
| Weight-average molecular might (Mw)/10$^4$ | 66.6 | 65.2 | 72.1 | 108.1 | 75.4 |
| Molecular weight distribution (Mw)/Mn) | 2.1 | 2.0 | 4.0 | 4.2 | 2.3 |
| Glass transition temperature (°C.) | −56 | −20 | −20 | −21 | −18 |
| Polymer No. | I | (II) | (III) | (IV) | (V) |
| Amount of crosslinkable functional group (mmol/g) | 0.11 | 0.24 | 0.17 | 0.24 | 0.76 |

| Composition of composing unit (%) | EXAMPLE α-7 | EXAMPLE α-8 | EXAMPLE α-9 | COMPARATIVE EXAMPLE α-5 | COMPARATIVE EXAMPLE α-6 |
|---|---|---|---|---|---|
| (a-1) | | | | | |
| Acrylic acid | — | — | — | — | — |
| (a-2) | | | | | |
| Ethyl acrylate | 97.3 | 44.4 | 43.0 | 11.5 | 11.4 |
| Butyl acrylate | — | 44.0 | 42.8 | 44.0 | 44.2 |
| Methoxyethyl acrylate | — | — | — | 42.5 | 42.5 |
| (b-1) | | | | | |
| Glycidyl methacrylate | — | 1.8 | 1.9 | 2.0 | 1.9 |
| 2-Isopropenyl-2-oxazoline | — | — | — | — | — |
| 2-Aziridinylethyl methacrylate | — | — | — | — | — |
| 2-Hydroxyethyl methacrylate | — | — | — | — | — |
| 2-Chloroethyl vinyl ether | 2.1 | — | — | — | — |
| (b-2) | | | | | |
| Acrylonitrile | — | 9.8 | — | — | — |
| Styrene | — | — | 12.3 | — | — |
| Polymer | | | | | |
| Polymerization conversion (%) | 84.2 | 80.0 | 83.3 | | |
| Number-average molecular weight (Mn)/10$^4$ | 18.9 | 23.5 | 17.5 | | 9.6 |
| Weight-average molecular weight (Mw/10$^4$ | 45.4 | 49.2 | 39.2 | *1 | 69.6 |
| Molecular weight distribution (Mw/Mn) | 2.4 | 2.1 | 2.2 | | 7.3 |
| Glass transition temperature | −20 | −30 | −31 | | −57 |

TABLE α-2-continued

| (°C.) Polymer No. | (VI) | (VII) | (VIII) | Comparative (I) | Comparative (II) |
|---|---|---|---|---|---|
| Amount of crosslinkable functional group (mmol/g) | 0.20 | 0.13 | 0.13 | 0.14 | 0.13 |

(Footnote)
*1: Measurements were impossible because of formation of a gelated (gelled) product.

EXAMPLE β-1

Into 100 parts of the macromolecular acrylic polymer (I) for acrylic rubber, were added 40 parts of HAF carbon (carbon black), 1 part of stearic acid and 3 parts of zinc dimethyldithiocarbamate with mixing those by an open roll. The operation performance of this mixing was evaluated by the undermentioned standards. The obtained mixture was subjected to primary vulcanization by carrying out press-processing in a metal mold for sheet-molding at 180° C. for 6 minutes and then to secondary vulcanization in an oven at 160° C. for 6 hours, whereby an acrylic rubber sheet was obtained. This molding performance was evaluated by the undermentioned standards. Physical properties of the obtained sheet were examined and the results obtained were shown in Table β-1. The tensile strength, elongation percentage and 100% modulus were measured according to the Japan Industrial Standard (JIS) K-6301. The hardness was measured by using the durometer (A-type). The water resistance was shown by a percentage (water absorption) of an increased weight of the acrylic rubber sheet, which was obtained after immersing the sheet cut into the definite size in warm water of 80° C. for 24 hours, against the sheet weight in the dry condition of before immersing. As a value of this percentage is larger, the water resistance is inferior. Also, the water resistance was evaluated by the undermentioned standards.

(Mixing operation performance)
  ⊙: No adhesion to an open roll and easy mixing.
  o: Adhesion to an open roll was recognized at the initial stage, but mixing was easy.
  x: Adhesion to an open roll was recognized till the post-stage and mixing was hard.
  x x: Adhesion to an open roll was still recognized after mixing and taking-out was difficult.

(Molding performance)
  ⊙: The surface of an obtained sheet was smooth and glossy.
  o: The surface of an obtained sheet was smooth and a little glossy.
  x: The surface of an obtained sheet had unevenness.
  x x: No fluidity and a sheet of an uniform thickness was not obtained.

(Water resistance)
  ⊙: Water absorption was 5% or less.
  o: Water absorption was over 5% and 10% or less.
  X: Water absorption was over 10% and 15% or less.
  x x: Water absorption was over 15%.

EXAMPLE β-2 to β-8

The procedure of EXAMPLE β-1 was repeated except that the macromolecular acrylic polymers (II) to (VIII) for acrylic rubber were used instead of the macromolecular acrylic polymer (I) for acrylic rubber and that the crosslinking agents shown in Table β-1 were used. Thereby acrylic rubber sheets were obtained. The mixing operation performance, molding performance and physical properties of the acrylic rubber sheets were examined in a manner similar to the above-mentioned and the results obtained were shown in Table β-1.

COMPARATIVE EXAMPLES β-1 and β-2

The procedure of EXAMPLE β-1 was repeated except that the comparative acrylic polymers (I) and (II) were used instead of the macromolecular acrylic polymer (I) for acrylic rubber and that the crosslinking agent shown in Table β-1 was used. Thereby acrylic rubber sheets were obtained. The mixing operation performance, molding performance and physical properties of the acrylic rubber sheets were examined in a manner similar to the above-mentioned and the results obtained were shown in Table β-1.

TABLE β-1

| | EXAMPLE β-1 | EXAMPLE β-2 | EXAMPLE β-3 | EXAMPLE β-4 | EXAMPLE β-5 |
|---|---|---|---|---|---|
| Acrylic polymer No. Crosslinking agent (parts) | (I) | (Ii) | (III) | (IV) | (V) |
| Zinc dimethyldithio carbamate | 3 | — | — | — | — |
| Maleic acid | — | 1.5 | 1.5 | — | — |
| Methoxymethylmelamine | — | — | — | 3 | — |
| o-Cresolnovolak-epoxy | — | — | — | — | 3 |
| Diaminodiphenylmethane | — | — | — | — | — |
| Mixing operation performance | ⊙ | ⊙ | o | o | ⊙ |

TABLE β-1-continued

| | | | | | |
|---|---|---|---|---|---|
| Molding performance | ⊚ | ⊚ | ⊚ | ⊚ | ⊚ |
| Physical properties of rubber | | | | | |
| Tensile strength (kg/cm²) | 122 | 168 | 158 | 163 | 174 |
| Elongation percentage (%) | 350 | 280 | 290 | 280 | 250 |
| 100% modulus (kg/cm²) | 31 | 58 | 53 | 47 | 67 |
| Hardness (JIS-A) | 62 | 66 | 65 | 63 | 67 |
| Water resistance | ⊚ | ○ | ○ | ○ | ○ |
| Water absorption (%) | 3.5 | 5.8 | 5.5 | 6.3 | 5.5 |

| | EXAMPLE β-6 | EXAMPLE β-7 | EXAMPLE β-8 | COMPARATIVE EXAMPLE β-1 | COMPARATIVE EXAMPLE β-2 |
|---|---|---|---|---|---|
| Acrylic polymer No. | (Vi) | (VI) | (VIII) | comparative (I) | comparative (II) |
| Crosslinking agent (parts) | | | | | |
| Zinc dimethyldithio carbamate | — | 3 | 3 | 3 | 3 |
| Maleic acid | — | — | — | — | — |
| Methoxymethylinelamine | — | — | — | — | — |
| o-Cresolnovolakepoxy | — | — | — | — | — |
| Diaminodiphenylmethane | 2 | — | — | — | — |
| Mixing operation performance | ○ | ⊚ | ○ | ⊚ | XX |
| Molding performance | ⊚ | ⊚ | ⊚ | X | ⊚ |
| Physical properties of rubber | | | | | |
| Tensile strength (kg/cm²) | 155 | 143 | 140 | 110 | 73 |
| Elongation percentage (%) | 295 | 330 | 320 | 370 | 600 |
| 100% modulus (kg/cm²) | 48 | 40 | 40 | 27 | 11 |
| Hardness (JIS-A) | 63 | 63 | 64 | 59 | 49 |
| Water resistance | ○ | ⊚ | ⊚ | XX | ⊚ |
| Water absorption (%) | 6.3 | 4.9 | 2.9 | 18.0 | 4.4 |

As seen in Table β-1, it was found that the polymers (I) to (VIII) obtained in EXAMPLES α-2 to α-9 were excellent in the mixing operation performance and molding performance and gave acrylic rubber superior in the strength and water resistance. The comparative acrylic polymer (I) obtained in COMPARATIVE EXAMPLE α-5 was somewhat inferior in the molding performance and bad in surface condition and gave rubber inferior in the water resistance. The comparative acrylic polymer (II) obtained in COMPARATIVE EXAMPLE α-6 was recognized to have strong tackiness to the roll when carrying out the mixing operation and gave rubber low in the strength.

EXAMPLES α-10 to α-15

The procedure of EXAMPLE α-4 was repeated except that monomer mixtures of the composition shown in Table α-3. Thereby macromolecular acrylic polymers (IX) to (XIV) for a pressure-sensitive adhesive were obtained as 100% polymers. The polymerization reaction was mild and stable similarly to EXAMPLE α-2.

COMPARATIVE EXAMPLE α-7

A monomer mixture was prepared by mixing 260 parts of butyl acrylate, 260 parts of ethyl acrylate, 12 parts of glycidyl methacrylate and 68 parts of styrene. Into a flask equipped with a stirrer, nitrogen-introducing tube, dropping funnel, thermometer and reflux condenser, was placed a portion of the monomer mixture, 240 parts, to which was further added 360 parts of ethyl acetate, and the resultant mixture was heated up to 85° C. with stirring while introducing a nitrogen gas into the mixture slowly. To this mixture, was added 0.96 parts of a 40% xylene solution of benzoyl peroxide as a polymerization initiator and, further, 360 parts of the residual monomer mixture and 0.72 parts of a 40% xylene solution of benzoyl peroxide were added dropwise at a constant rate during 1.5 hours. After aging for 1 hour, the solid content was diluted to 40% by using ethyl acetate and toluene and the aging was further carried out for 3.5 hours to carry out a polymerization reaction. Then the solvent was removed by a vacuum drier till attaining a constant amount. The obtained comparative acrylic polymer (III) contained a portion insoluble in tetrahydrofuran, which was thought because the polymer was converted into a three-dimensional structure in drying, and the molecular weight measurement could not be carried out.

COMPARATIVE EXAMPLE α-8

A pre-emulsion, 146.1 parts, was prepared by shaking with stirring 86 parts of 2-ethylhexyl acrylate, 10 parts of butyl acrylate, 2 parts of hydroxyethyl methacrylate, 2 parts of acrylic acid, 0.1 parts of tertiarydodecylmercaptan, 11.5 parts of a 26% aqueous solution of sodium polyoxyethylene nonyl phenyl ether sulfate and 34.5 parts of ion-exchanged water in a dropping funnel.

Into a flask equipped with a stirrer, nitrogen-introducing tube, dropping funnel, thermometer and reflux condenser, was charged 38.2 parts of ion-exchanged water and the inside atmosphere of the flask was sufficiently displaced by nitrogen gas with stirring while maintaining the liquid temperature at 70° C. Then, a 1% amount (that is 1.461 parts) of the pre-emulsion prepared beforehand and 8 parts of potassium persulfate were added to initiate a polymerization reaction. The residual pre-emulsion was added dropwise into the flask during 3 hours and 15 parts of a 1% aqueous solution of sodium hydrogen sulfite was equally divided and added at intervals of 10 minutes in the course of the pre-emulsion addition. After completion of the addition, aging was carried out for 1 hour, thereby a comparative acrylic polymer (IV) was obtained, which was insoluble in tetrahydrofuran so that, the molecular weight measurement was impossible.

COMPARATIVE EXAMPLE α-9

A monomer mixture was prepared by mixing 570 parts of butyl acrylate and 30 parts of acrylic acid. Into a flask equipped with a stirrer, nitrogen-introducing tube, dropping funnel, thermometer and reflux condenser, was charged a portion of the monomer mixture, 240 parts, and furthermore, added 375.4 parts of ethyl acetate, and the resultant mixture was heated up to 85° C. with stirring while introducing a nitrogen gas into the flask slowly. To this, was added 0.96 parts of a 40% solution of benzoyl peroxide in xylene as a polymerization initiator, and furthermore, 360 parts of the residual monomer mixture and 0.72 parts of a 40% solution of benzoyl peroxide in xylene were added dropwise at a constant rate during 1.5 hours. After aging for 1 hour, the solid content was diluted to 40% by using ethyl acetate and toluene and then aging was further carried out for 3.5 hours to complete a polymerization reaction. The obtained comparative acrylic polymer (V) had a number-average molecular weight (Mn) of 41,000, a weight-average molecular weight (Mw) of 950,000 and a Mw/Mn ratio of 23.3, so that its molecular weight distribution was very broad.

COMPARATIVE EXAMPLES α-10 to α-12

The procedure of COMPARATIVE EXAMPLE α-9 was repeated except that monomer mixtures of the composition shown in Table α-3 were used. Thereby comparative acrylic polymers (VI) to (VIII) were obtained.

For the macromolecular acrylic polymers (IX) to (XIV) for a pressure-sensitive adhesive as well as the comparative polymers (III) and (VIII), were shown in Table α-4 the composition of composing units, number-average molecular weight (Mn), weight-average molecular weight (Mw), molecular weight distribution (Mw/Mn), amount of a crosslinkable functional group and glass transition temperature.

TABLE α-3

| Composition of monomer mixture (parts) | EXAMPLE α-10 | EXAMPLE α-11 | EXAMPLE α-12 | EXAMPLE α-13 |
|---|---|---|---|---|
| (A-1) | | | | |
| Acrylic acid | 75 | 75 | 75 | 60 |
| 2-Hydroxyethyl acrylate | — | — | — | 4.5 |
| (A-2) | | | | |
| Methyl acrylate | 1425 | 1425 | 1425 | 459 |
| 2-Ethylhexyl acrylate | — | — | — | 917 |
| (B-2) | | | | |
| Vinyl acetate | — | — | — | 60 |
| Mercaptan | | | | |
| 2-Ethylhexyl thioglycolate | 0.45 | — | 12.9 | — |
| Trimethylolpropane tristhioglycolate | — | 1.31 | — | — |
| Pentaerythrytol tetrakisthio-glycolate | — | — | — | 1.31 |
| Benzoyl peroxide (40% solution in xylene) | — | — | — | — |
| Solvent | | | | |
| Ethyl acetate | — | — | — | — |
| Toluene | — | — | — | — |

TABLE α-3-continued

| Composition of monomer mixture (parts) | EXAMPLE α-14 | EXAMPLE α-15 | COMPARATIVE EXAMPLE α-10 | COMPARATIVE EXAMPLE α-11 | COMPARATIVE EXAMPLE α-12 |
|---|---|---|---|---|---|
| (A-1) | | | | | |
| Acrylic acid | 31 | 52.5 | 18 | 10 | 13 |
| 2-Hydroxyethyl acrylate | — | 3 | 1 | — | 1 |
| (A-2) | | | | | |
| Methyl acrylate | — | 904.5 | 140 | — | 224 |
| 2-Ethylhexyl acrylate | 1014 | 465 | 278 | 275 | 115 |
| (B-2) | | | | | |
| Vinyl acetate | 450 | 75 | 18 | 122 | 19 |
| Mercaptan | | | | | |
| 2-Ethylhexyl thioglycolate | — | — | — | — | — |
| Trimethylolpropane tristhioglycolate | — | — | — | — | — |
| Pentaerythrytol tetrakisthioglycolate | 0.44 | 4.5 | — | — | — |
| Benzoyl peroxide (40% solution in xylene) | — | — | 2 | 4 | 2 |
| Solvent | | | | | |
| Ethyl acetate | — | — | 327 | 346 | 251 |
| Toluene | — | — | 229 | 258 | 262 |

TABLE α-4

| Composition of composing unit (%) | EXAMPLE α-10 | EXAMPLE α-11 | EXAMPLE α-12 | EXAMPLE α-13 |
|---|---|---|---|---|
| (a-1) | | | | |
| Acrylic acid | 5.8 | 4.7 | 5.2 | 4.1 |
| 2-Hydroxyethyl acrylate | — | — | — | 0.3 |
| (a-2) | | | | |
| Butyl acrylate | 94.2 | 95.3 | 94.8 | 30.9 |
| Ethyl acrylate | — | — | — | — |
| 2-Ethylhexyl acrylate | — | — | — | 61.0 |
| (b-1) | | | | |
| 2-Hydroxyethyl methacrylate | — | — | — | — |
| Glycidyl methacrylate | — | — | — | — |
| (b-2) | | | | |
| Styrene | — | — | — | — |
| Vinyl acetate | — | — | — | 3.7 |
| Polymer | | | | |
| Polymerization conversion (%) | 54.5 | 75.0 | 80.0 | 75.3 |
| Number-average molecular weight (Mn/10,000) | 16.1 | 8.6 | 2.3 | 13.1 |
| Weight-average molecular weight (Mw/10,000) | 40.8 | 27.5 | 4.3 | 53.4 |
| Molecular weight distribution (Mw/Mn) | 2.5 | 3.2 | 1.9 | 4.1 |
| Glass transition temperature (°C.) | −49 | −50 | −49 | −58 |
| Polymer No. | (IX) | (X) | (XI) | (XII) |

TABLE α-4-continued

| Amount of crosslinkable functional group (mmol/g) | 0.80 | 0.65 | 0.72 | 0.60 |
|---|---|---|---|---|

| Composition of composing unit (%) | EXAMPLE α-14 | EXAMPLE α-15 | COMPARATIVE EXAMPLE α-7 | COMPARATIVE EXAMPLE α-8 |
|---|---|---|---|---|
| (a-1) | | | | |
| Acrylic acid | 2.5 | 3.5 | — | 2.0 |
| 2-Hydroxyethyl acrylate | — | 0.2 | — | — |
| (a-2) | | | | |
| Butyl acrylate | — | 60.8 | 43.3 | 10.0 |
| Ethyl acrylate | — | — | 43.4 | — |
| 2-Ethylhexyl acrylate | 69.0 | 30.9 | — | 86.0 |
| (b-1) | | | | |
| 2-Hydroxyethyl methacrylate | — | — | — | 2.0 |
| Glycidyl methacrylate | — | — | 2.0 | — |
| (b-2) | | | | |
| Styrene | — | — | 11.3 | — |
| Vinyl acetate | 28.5 | 4.6 | — | — |
| Polymer | | | | |
| Polymerization conversion (%) | 94.0 | 69.5 | | |
| Number-average molecular weight (Mn/10,000) | 6.6 | 7.3 | *1 | *2 |
| Weight-average molecular weight (Mw/10,000) | 31.7 | 25.6 | | |
| Molecular weight distribution (Mw/Mn) | 4.8 | 3.5 | | |
| Glass transition temperature (°C.) | −46 | −53 | −30 | −65 |
| Polymer No. | (XIII) | (XIV) | Comparative (III) | Comparative (IV) |
| Amount of crosslinkable functional group (mmol/g) | 0.35 | 0.50 | 0.14 | 0.43 |

| Composition of composing unit (%) | COMPARATIVE EXAMPLE α-9 | COMPARATIVE EXAMPLE α-10 | COMPARATIVE EXAMPLE α-11 | COMPARATIVE EXAMPLE α-12 |
|---|---|---|---|---|
| (a-1) | | | | |
| Acrylic acid | 5.0 | 4.0 | 2.4 | 3.5 |
| 2-Hydroxyethyl acrylate | — | 0.3 | — | 0.2 |
| (a-2) | | | | |
| Butyl acrylate | 95.0 | 30.6 | — | 60.3 |
| Ethyl acrylate | — | — | — | — |
| 2-Ethylhexyl acrylate | — | 61.1 | 67.6 | 31.0 |
| (b-1) | | | | |
| 2-Hydroxyethyl methacrylate | — | — | — | — |
| Glycidyl methacrylate | — | — | — | — |
| (b-2) | | | | |

TABLE α-4-continued

|  |  |  |  |  |
|---|---|---|---|---|
| Styrene | — | — | — | — |
| Vinyl acetate | — | 4.0 | 30.0 | 5.0 |
| Polymer |  |  |  |  |
| Polymerization conversion (%) | — | — | — | — |
| Number-average molecular weight (Mn/10,000) | 4.1 | 2.4 | 7.0 | 5.9 |
| Weight-average molecular weight (Mw/10,000) | 95.0 | 52.4 | 78.4 | 84.0 |
| Molecular weight distribution (Mw/Mn) | 23.3 | 22.3 | 11.3 | 14.0 |
| Glass transition temperature (°C.) | −50 | −58 | −45 | −53 |
| Polymer No. | Comparative (V) | Comparative (VI) | Comparative (VII) | Comparative (VIII) |
| Amount of crosslinkable functional group (mmol/g) | 0.69 | 0.58 | 0.33 | 0.50 |

(Footnote)
*1: A part of the polymer gelated (gelled) when drying.
*2: The polymer was insoluble in tetrahydrofuran.

EXAMPLE γ-1

A pressure-sensitive adhesive tape was obtained by coating 100 parts of the macromolecular acrylic polymer (VIII) for a pressure-sensitive adhesive on polyester film of 25 μm by a hot melt roll coater so as to be 25 μm in dry film thickness.

COMPARATIVE EXAMPLE γ-1

A pressure-sensitive adhesive tape was obtained by coating 100 parts of the comparative acrylic polymer (III) on polyester film of 25 μm by a hot melt roll coater so as to be 25 μm in dry film thickness.

COMPARATIVE EXAMPLE γ-2

A pressure-sensitive adhesive tape was obtained by coating a mixture, which was prepared by adding 1 part of a 25% dispersion of zinc oxide in water to 100 parts of the comparative acrylic polymer (IV) and adjusting its viscosity to 10,000 cps by a polycarboxylic acid-based thickener, on polyester film of 25 μm by an applicator so as to be 25 μm in dry film thickness and then by heating at 100° C. for 2 minutes.

Adhesive physical properties of these pressure-sensitive adhesive tapes were examined and the results obtained were shown in Table γ-1.

The ball tack, adhesive strength, adhesive strength at high temperature and shear adhesion were measured according to the Japan Industrial Standard (JIS) Z-0237. The softening point with temperature-rise was measured by raising temperature from 40° C. under the conditions of 3° C. per 5 minutes with a load of 1 kg and shear adhesion of JIS Z-0237. For the removability there was evaluated by the undermentioned standards the condition of adhesive transfer to an adherend SUS in measuring the adhesive strength of after 1 month since tape-attaching. For the water resistance there was evaluated by the undermentioned standards the whitening degree examined after immersing the pressure-sensitive adhesive tape in ion-exchanged water for 1 day.

(Removability)

○: No adhesive transfer.

Δ: Partial adhesive transfer.

x: Much adhesive transfer.

(Water resistance)

○: Almost no whitening.

Δ: Partial whitening.

x: Whitening on the almost whole face.

TABLE γ-1

|  | EXAMPLE γ-1 | COMPARATIVE EXAMPLE γ-1 | COMPARATIVE EXAMPLE γ-2 |
|---|---|---|---|
| Acrylic polymer No. | (VIII) | Comparative (III) | Comparative (IV) |
| Solid content of acrylic polymer (parts) | 100 | 100 | 50 |
| Crosslinking agent (parts) |  |  |  |
| 25% dispersion of zinc oxide in water | — | — | 1.0 |
| Adhesive physical properties |  |  |  |
| Ball tack | <2 | <2 | 12 |
| Adhesive strength (g/25 mm) | 850 | 960 | 560 |
| Shear adhesion (time till falling down) | 4.3 hours | 6.4 hours | 49 minutes |
| Softening point with temperature-rise (°C.) | 122 | 101 | 92 |

TABLE γ-1-continued

|  | EXAMPLE γ-1 | COMPARATIVE EXAMPLE γ-1 | COMPARATIVE EXAMPLE γ-2 |
|---|---|---|---|
| Removability | ○ | from Δ to X | X |
| Water resistance | ○ | ○ | X |

As seen in Table γ-1, the macromolecular acrylic polymer (VIII) for a pressure-sensitive adhesive, compared with the comparative acrylic polymer (III), as found to be superior in the softening point with temperature-rise, that is heat resistance, and removability in a case of almost the same shear adhesion. Also, the macromolecular acrylic polymer (IX), compared with the comparative acrylic polymer (IV) obtained by emulsion polymerization, was found to be superior in the heat resistance, removability and water resistance.

(Compatibility)

○: Easy, homogeneous mixing.

Δ: Although taking a time, mixing was homogeneous.

x: Homogeneous mixing was difficult.

TABLE γ-2

|  | EXAMPLE γ-2 | EXAMPLE γ-3 | EXAMPLE γ-4 | COMPARATIVE EXAMPLE γ-3 |
|---|---|---|---|---|
| Acrylic polymer No. | (IX) | (X) | (XI) | Comparative (V) |
| Solid content of acrylic polymer (parts) | 100 | 100 | 100 | 100 |
| Combination (parts) | | | | |
| Toluene | 97.0 | 97.0 | 97.0 | — |
| Ethyl acetate | 97.0 | 97.0 | 97.0 | — |
| Crosslinking agent (parts) | | | | |
| Aluminum chelate A *1 | 1.3 | 1.0 | 6.6 | 1.0 |
| Compatibility | ○ | ○ | ○ | X |
| Adhesive physical properties | | | | |
| Ball tack | 9 | 9 | 8 | 8 |
| Adhesive strength (g/25 mm) | 550 | 680 | 540 | 580 |
| Shear adhesion (mm/24 hours) | 0.8 | 0.9 | 0.6 | 0.5 |
| Softening point with temperature-rise (°C.) | 180 | 179 | 179 | 170 |
| Removability | ○ | ○ | ○ | from Δ to X |
| Water resistance | ○ | ○ | ○ | ○ |

(Footnote)
*1 Aluminum chelate A: Metal crosslinking agent made by Kawaken Fine Chemical Co., Ltd.

EXAMPLES γ-2 to γ-4 and COMPARATIVE EXAMPLE γ-3

The macromolecular acrylic polymers (IX) to (XI) for a pressure-sensitive adhesive and comparative acrylic polymer (V) were mixed by the combination shown in Table γ-2. The compatibility in mixing the resultant composition with a crosslinking agent by a stirrer was evaluated by the undermentioned standards. A pressure-sensitive adhesive tape was obtained by coating the above-obtained mixture on polyester film of 25 μm by an applicator so as to be 25 μm in dry film thickness and then by heating the coated film at 100° C. for 2 minutes. Adhesive physical properties of this pressure-sensitive adhesive tape were examined in a manner similar to EXAMPLE γ-1 and the results obtained were shown in Table γ-2.

As seen in Table γ-2, the macromolecular acrylic polymers (IX) to (XI) for a pressure-sensitive adhesive, compared with the comparative acrylic polymer (V), were found to be superior in compatibility and superior in heat resistance and removability in a case of almost the same shear adhesion.

EXAMPLES γ-5 and γ-6 and COMPARATIVE EXAMPLES γ-4 and γ-5

The procedure of EXAMPLE γ-2 was repeated except that the macromolecular acrylic polymers (XII) and (XIII) for a pressure-sensitive adhesive and the comparative acrylic polymers (VI) and (VII) were used instead of the macromolecular acrylic polymer (IX) for a pressure-sensitive adhesive and that the combination shown in Table γ-3 was used. Thereby pressure-sensitive adhesive tapes were obtained.

EXAMPLE γ-7 and COMPARATIVE EXAMPLE γ-6

The procedure of EXAMPLE γ-2 was repeated except that the macromolecular acrylic polymer (XIV) for a pressure-sensitive adhesive and the comparative acrylic polymer (VIII) were used instead of the macromolecular acrylic polymer (IX) for a pressure-sensitive adhesive, that the dry film thickness was set at 60 μm by the combination shown in Table γ-3, and that the tapes were double face-coated type. Thereby pressure-sensitive adhesive tapes were obtained.

Adhesive physical properties of these pressure-sensitive adhesive tapes were examined in a manner similar to EXAMPLE γ-1 and the results obtained were shown in Table γ-3.

methyl methacrylate, 75 parts of hydroxyethyl methacrylate and 30 parts of octyl thioglycolate, and these were stirred. The resultant mixture was heated up to 100° C. with stirring while introducing a nitrogen gas into the mixture slowly. When a polymerization reaction was continued for 2 hours at the temperature, a polymerization intermediate was continuously taken out of lower part of the flask at the rate of 750 parts per hour and introduced into a static mixer type polymerization apparatus, and the polymerization reaction was further continued at 100° C. for 1 hour. Into the flask, was supplied a monomer mixture of the same composition as the above-mentioned similarly at the rate of 750 parts per hour and the polymerization reaction was continuously advanced. The resultant acrylic polymer had polymerization conversion of 85%, a color number value (hereinafter, referred to as "APHA value") by the APHA method (American Public Health Association's method) of a reaction mixture containing the polymer was 5 or less, and the

TABLE γ-3

| | EXAMPLE γ-5 | COMPARATIVE EXAMPLE γ-4 | EXAMPLE γ-6 | COMPARATIVE EXAMPLE γ-5 | EXAMPLE γ7 | COMPARATIVE EXAMPLE γ6 |
|---|---|---|---|---|---|---|
| Acrylic polymer No. | (XII) | Comparative (VI) | (XIII) | Comparative (VII) | (XIV) | Comparative (VIII) |
| Solid content of acrylic polymer (parts) | 100 | 100 | 100 | 100 | 100 | 100 |
| Combination (parts) | | | | | | |
| Toluene | 64.9 | — | 125.0 | — | 55.6 | 4.1 |
| Ethyl acetate | 64.9 | — | 125.0 | — | 45.8 | — |
| Polymerized rosin-based tackifier | — | — | — | — | 25.0 | 25.0 |
| Crosslinking agent (parts) | | | | | | |
| Colonate *1 | 0.5 | 0.5 | — | — | 1.0 | 1.2 |
| Aluminum chelate A *2 | — | — | 1.5 | 1.6 | — | — |
| Compatibility | Δ | Δ | ○ | from Δ to X | ○ | X |
| Adhesive physical properties | | | | | | |
| Ball tack | 8 | 6 | 4 | 5 | 13 | 13 |
| Adhesive strength (g/25 mm) | 740 | 770 | 880 | 900 | 2280 | 2480 |
| Shear adhesion (mm/24 hours) | 0.1 | 0.3 | 0.1 | 0.1 | 1.8 | 1.0 |
| Softening point with temperature-rise *3 | 0.1 mm | 2.0 mm | 0.3 mm | 2.0 mm | 5.8 mm | 137° C. |
| Removability | ○ | X | ○ | X | ○ | X |
| Water resistance | ○ | ○ | ○ | ○ | ○ | ○ |

(Footnote)
*1 Colonate: Isocyanate-based crosslinking agent made by Nippon Polyurethane Co., Ltd.
*2 Aluminum chelate A: Metal crosslinking agent made by Kawaken Fine Chemical Co., Ltd.
*3 Softening point with temperature-rise: Temperature (°C.) when falling, or slip width (mm) at 200° C.

As seen in Table γ-3, each of the macromolecular acrylic polymers for a pressure-sensitive adhesive was found to be superior in compatibility, heat resistance and removability, when compared with the comparative acrylic polymers having almost the same composition as the composition of said macromolecular acrylic polymers for a pressure-sensitive adhesive.

EXAMPLE 1-1

The inside atmosphere of a flask equipped with a stirrer, nitrogen-introducing tube, thermometer and reflux condenser was displaced by a nitrogen gas, then into this flask, were charged 1200 parts of ethyl acrylate, 225 parts of polymer had a number-average molecular weight (Mn) of 5,000, a weight-average molecular weight (Mw) of 9,000 and a molecular weight distribution (Mw/Mn) of 1.8. The reaction solution containing the polymer was continuously supplied to a flash tank, which had been heated at 150° C. and of which inside pressure had been reduced to 20 mmHg, and then volatile components were removed. Thereby the polymer was isolated as a 100% polymer.

The obtained acrylic polymer, 100 parts, was heated at 50° C., 10 parts of isophorone diisocyanate was added to the polymer to make a homogeneous solution, and this solution was cast on a plate made of ethylene tetrafluoride resin (trade name: Teflon, made by Du Pont (E. I.) de Nemours & Co.) and allowed to react at 150° C. for 30 minutes. Thereby a film of 0.2 mm thickness was obtained. The strength of this film was measured, so that the fracture strength was 120 kg/cm$^2$ and the elongation was 400%.

From the results, it is understood that the polymer obtained in EXAMPLE 1-1 is large in strength and elongation and can be preferably used for a coating and a sealing agent.

COMPARATIVE EXAMPLE 1-1

A mixed solution of starting materials was prepared by dissolving 1200 parts of ethyl acrylate, 225 parts of methyl acrylate, 75 parts of hydroxyethyl methacrylate and 10 parts of azobis(isobutyronitrile) into 1500 parts of xylene. Into a flask equipped with a stirrer, nitrogen-introducing tube, dropping funnel, thermometer and reflux condenser, was charged a one-third amount of the mixed solution, which was then heated up to 100° C. with stirring while introducing a nitrogen gas into the solution slowly, and to which a residual amount of the mixed solution was added dropwise during 3 hours, and the reaction mixture was aged for further 1 hour to complete the polymerization reaction. An obtained acrylic polymer had APHA value of 5 or less, Mn of 4,000, Mw of 80,000 and Mw/Mn ratio of 10.0, so that its molecular weight distribution was very broad.

Similarly to EXAMPLE 1-1, to 100 parts of the obtained acrylic polymer, was added 5 parts of isophorone diisocyanate to make a homogeneous solution, and this solution was cast on a plate made of ethylene tetrafluoride resin (trade name: Teflon, made by Du Pont (E. I.) de Nemours & Co.) and allowed to react at 150° C. for 30 minutes. Thereby a film of 0.2 mm thickness was obtained. The strength of this film was measured, so that the fracture strength was 98 kg/cm$^2$ and the elongation was 300%, therefore the strength was inferior to the case of EXAMPLE 1-1.

It is thought that this result is because the molecular weight distribution is broad and large amounts of low molecular weight polymers not having a hydroxyl group, that is a crosslinkable group, exist.

COMPARATIVE EXAMPLE 1-2

The procedure of EXAMPLE 1-1 was repeated except that 1.5 parts of benzoyl peroxide, which is a polymerization initiator, was charged instead of 30 parts of octyl thioglycolate. In this case, the reaction temperature could not be maintained at a constant condition after 30 minutes since initiation of the polymerization, and rose up to 160° C., so that the polymerization could not be carried out under a stable condition. This suggests that danger of explosion owing to a rapid and intensive reaction is comprised on an industrial production scale.

COMPARATIVE EXAMPLE 1-3

The procedure of EXAMPLE 1-1 was repeated except that 30 parts of octyl thioglycolate which is a mercaptan was not charged. In this case, the reaction temperature rose up to 130° C. after 1 hour and 30 minutes since initiation of the polymerization, so that the polymerization could not be carried out under a stable condition. Also, an obtained polymer was a gelated (gelled) product. This case also suggests danger of explosion owing to a rapid and intensive reaction on an industrial production scale.

COMPARATIVE EXAMPLE 1-4

Into an apparatus and a polymerizable monomer mixture similar to those in EXAMPLE 1-1, was charged 20 parts of azobis(cyclohexanecarbonitrile), which is a polymerization initiator, and a polymerization reaction was carried out at 80° C. while introducing a nitrogen gas into the monomer mixture slowly. After one hour, because it became impossible to maintain a constant temperature in an inside of the flask, the temperature was maintained as constant by continuously taking a reaction mixture out of a lower part of the flask at the rate of 1000 parts per hour, by beginning introducing the mixture into a KRC kneader (a self-cleaning continuous type of kneader made by Kurimoto Tekkosho Co., Ltd.) as well as by adding a monomer mixture of the same composition as the above-mentioned into the flask dropwise at the same rate as the above. Although a polymerization reaction was carried out in the KRC kneader for 1.5 hours, the temperature at an inlet part of the kneader was 80° C., whereas the temperature near an outlet of the kneader was 150° C., so that temperature-rise in the kneader was recognized. The resultant acrylic polymer had polymerization conversion of 96.0%, APHA value of 5 or less, Mn of 4,000, Mw of 60,000, and Mw/Mn ratio of 15.0. This polymer was isolated as a 100% polymer from a solution containing the polymer in a manner similar to EXAMPLE 1-1. The obtained acrylic polymer, 100 parts, was added to 1000 parts of tetrahydrofuran and, although stirring was sufficiently carried out in order to dissolve the polymer into the tetrahydrofuran, insoluble portions were recognized and a homogeneous solution was not obtained.

That is, as in COMPARATIVE EXAMPLE 1-4, if 20 parts of azobis(cyclohexanecarbonitrile), which is a polymerization initiator, and 30 parts of octyl thioglycolate, which is a mercaptan, are charged into a monomer mixture, a monomer mixture of low temperature for dropping must be added dropwise to maintain an inside temperature of a flask as constant and a polymerization reaction proceeds on delicate balance, so that this procedure is not preferable as an industrial process in view of safety and, furthermore, gel portions are produced in a reaction solution.

COMPARATIVE EXAMPLE 1-5

While air instead of a nitrogen gas was slowly introduced into a apparatus and a polymerizable monomer mixture similar to those in EXAMPLE 1-1, the mixture was heated up to 100° C. with stirring. The temperature rose up to 105° C. after hour since initiation of a polymerization reaction, however, thereafter the polymerization reaction could be carried out under stable conditions and the procedure similar to that of EXAMPLE 1-1 was carried out. The resultant acrylic polymer had polymerization conversion of 92%, APHA value of 30, Mn of 5,000, Mw of 10,000, and Mw/Mn ratio of 2.0. The reaction solution containing the polymer was continuously supplied to a flash tank, which had been heated at 150° C. and of which inside pressure had been reduced to 20 mmHg, and then volatile components were removed. Thereby the polymer was isolated as a 100% polymer.

For strength of film obtained by using this polymer in a manner similar to EXAMPLE 1-1, the fracture strength was 110 kg/cm$^2$ and the elongation was 380%.

That is, the polymer obtained by the procedure of COMPARATIVE EXAMPLE 1-5 had the satisfying film strength, however, was recognized to be colored, therefore, was unpreferable one as an acrylic polymer which is characterized by transparency. Also, because only a little temperature-rise was recognized, on an industrial scale, explosion due to a rapid and intensive reaction is feared.

EXAMPLES 1-2 to 1-5

The procedure of EXAMPLE 1-1 was repeated except that monomer mixtures of the composition shown in Table 1-1 were used. Thereby acrylic polymers were obtained as 100% polymers. In any EXAMPLES, the polymerization reaction was mild and stable and an acrylic polymer, which was not colored and had narrow molecular weight distribution, was obtained.

In Table 1-1 there were also shown the composition of monomer mixtures in EXAMPLE 1-1 and COMPARATIVE EXAMPLE 1-5, kind and amount for use of mercaptans, presence or absence of polymerization initiator, polymerization temperature, kind of atmosphere during the polymerization, and physical properties of polymers.

TABLE 1-1

| Composition of monomer mixture (parts) | EXAMPLE 1-1 | EXAMPLE 1-2 | EXAMPLE 1-3 |
|---|---|---|---|
| (A-1) | | | |
| Acrylic acid | — | — | 15 |
| (A-2) | | | |
| Ethyl acrylate | 1200 | 800 | 400 |
| Butyl acrylate | — | — | 485 |
| 2-Ethylhexyl acrylate | — | — | — |
| (B-1) | | | |
| Glycidyl methacrylate | — | 30 | — |
| 2-Hydroxyethyl methacrylate | 75 | — | 15 |
| (B-2) | | | |
| Acrylonitrile | — | 70 | — |
| Styrene | — | — | 385 |
| Methyl methacrylate | 225 | 600 | — |
| Butyl methacrylate | — | — | 200 |
| Mercaptan | | | |
| Octyl thioglycolate | 30 | — | — |
| Thioglycolic acid | — | — | — |
| Trimethylolpropane trithioglycolate | — | 1.5 | — |
| Dodecyl mercaptan | — | — | 0.5 |
| Polymerization initiator | absent | absent | absent |
| Polymerization temperature (°C.) | 100 | 100 | 120 |
| Kind of atmosphere during the polymerization | Nitrogen | Nitrogen | Nitrogen |
| Polymer | | | |
| Polymerization conversion (%) | 85 | 80 | 88 |
| APHA value | 5> | 5> | 5> |
| Number-average molecular weight (Mn)/10,000 | 0.5 | 9.5 | 14.3 |
| Weight-average molecular weight (Mw)/10,000 | 0.9 | 16.8 | 40.5 |
| Molecular weight distribution (Mw/Mn) | 1.8 | 1.8 | 2.8 |

TABLE 1-1-continued

| Composition of monomer mixture (parts) | EXAMPLE 1-4 | EXAMPLE 1-5 | COMPARATIVE EXAMPLE 1-5 |
|---|---|---|---|
| (A-1) | | | |
| Acrylic acid | — | 45 | — |
| (A-2) | | | |
| Ethyl acrylate | — | — | 1200 |
| Butyl acrylate | 500 | 1055 | — |
| 2-Ethylhexyl acrylate | 500 | — | — |
| (B-1) | | | |
| Glycidyl methacrylate | — | 100 | — |
| 2-Hydroxyethyl methacrylate | — | 100 | 75 |
| (B-2) | | | |
| Acrylonitrile | — | — | — |
| Styrene | — | — | — |
| Methyl methacrylate | — | — | 225 |
| Butyl methacrylate | 500 | 200 | — |
| Mercaptan | | | |
| Octyl thioglycolate | 1.5 | — | 30 |
| Thioglycolic acid | — | 15 | — |
| Trimethylolpropane trithioglycolate | 4.5 | — | — |
| Dodecyl mercaptan | — | — | — |
| Polymerization initiator | absent | absent | absent |
| Polymerization temperature (°C.) | 140 | 120 | from 100 to 105 |
| Kind of atmosphere during the polymerization | Nitrogen | Nitrogen | Air |
| Polymer | | | |
| Polymerization conversion (%) | 92 | 90 | 92 |
| APHA value | 5> | 5> | 30 |
| Number-average molecular weight (Mn)/10,000 | 2.3 | 0.9 | 0.5 |
| Weight-average molecular weight (%)/10,000 | 4.1 | 1.7 | 1.0 |
| Molecular weight distribution (Mw/Mn) | 1.8 | 1.9 | 2.0 |

EXAMPLE 2-1

Into a reaction vessel equipped with a stirrer, thermometer and condenser, was charged a mixed solution comprising 33.3 parts of acrylic acid, 30.0 parts of methyl methacrylate, 36.6 parts of ethyl acrylate and 2.0 parts of 2-ethylhexyl thioglycolate, the inside atmosphere of the vessel was sufficiently displaced by a nitrogen gas, and then the solution was heated by using an oil bath of 100° C. to initiate a polymerization reaction.

The inside temperature was about 100° C. and the polymerization proceeded without a runaway reaction. The polymerization conversion was estimated by measuring volatile components, so that it increased almost linearly and reached 31% after 2 hours, 60% after 4 hours and 95% after 7 hours. The reaction was ceased by adding 0.4 parts of 6-tertiary-butyl-2,4-xylenol, and unreacted monomers was removed with distillation by flashing reaction products into a tank of which inside pressure had been reduced to 5 Torr and which had been heated at 210° C.

Molecular weight was measured by gel permeation chromatography, so that a polymerized product had a number-average molecular weight of 19,000, a weight-average molecular weight of 34,000 and a molecular weight distribution of 1.7. Also, the polymerized product was soluble in an aqueous sodium hydroxide solution and aqueous ammonia, and its acid value measured by the titration method was 360 mg/g. The polymerized product was soluble in THF (tetrahydrofuran), methanol and so forth, however, insoluble in chloroform, n-hexane and so forth.

The polymerized product of this composition is subjected to injection molding and can be used for a lost core and so forth by utilizing its solubility in an alkali.

EXAMPLES 2-2 and 2-3

The procedure of EXAMPLE 2-1 was repeated except that the amount of 2-ethylhexyl thioglycolate was changed to 4.0 parts in EXAMPLE 2-2 and to 1.0 part in EXAMPLE 2-3. In these cases, similarly, the polymerization proceeded under stable conditions without a runaway reaction.

For polymerized products, their number-average molecular weight, weight-average molecular weight, molecular weight distribution and acid value were shown in Table 2-1. It is shown that the molecular weight control is possible by changing the adding amount of 2-ethylhexyl thioglycolate.

TABLE 2-1

|  | Number-average molecular weight | Weight-average molecular weight | Molecular weight distribution | Acid value (mg/g) |
|---|---|---|---|---|
| EXAMPLE 2-2 | 9,500 | 17,000 | 1.79 | 350 |
| EXAMPLE 2-3 | 63,000 | 103,000 | 1.65 | 360 |

EXAMPLES 2-4 to 2-6

The procedure of EXAMPLE 2-1 was repeated except that the kind and amount of sulfur compound were changed to 2.0 parts of n-dodecyl mercaptan in EXAMPLE 2-4, 0.8 parts of mercaptoethanol in EXAMPLE 2-5 and 0.9 parts of thioglycolic acid in EXAMPLE 2-6. In these cases, the polymerization proceeded under stable conditions without a runaway reaction.

The amount of sulfur compounds, number-average molecular weight, weight-average molecular weight, molecular weight distribution and acid value were shown in Table 2-2.

EXAMPLE 2-7

The procedure of EXAMPLE 2-1 was repeated except that the kind and amount of sulfur compound were changed to 2.5 parts of tetraethylthiuram disulfide and that the oil bath temperature was changed to 110° C. In this case, the polymerization proceeded under stable conditions without a runaway reaction.

A polymerized product had a number-average molecular weight of 15,000, a weight-average molecular weight of 31,000, a molecular weight distribution of 2.1 and an acid value of 350 mg/g.

EXAMPLE 2-8

The procedure of EXAMPLE 2-1 was repeated except that 0.1 part of 1,1'-azobis(cyclohexane-1-carbonitrile), a polymerization initiator, was added. In this case, the polymerization proceeded under stable conditions without a runaway reaction.

A polymerized product had a number-average molecular weight of 15,000, a weight-average molecular weight of 34,000, a molecular weight distribution of 2.3 and art acid value of 350 mg/g.

COMPARATIVE EXAMPLE 2-1

The procedure of EXAMPLE 2-1 was repeated except that 1 part of 1,1'-azobis(cyclohexane-1-carbonitrile), a polymerization initiator, was added. In this case, the inside temperature rose up to 132° C. after 11 minutes since initiation of heating, and a reaction proceeded recklessly.

A polymerized product had a number-average molecular weight of 7,700, a weight-average molecular weight of 43,000 and a molecular weight distribution of 5.6.

COMPARATIVE EXAMPLE 2-2

The procedure of EXAMPLE 2-1 was repeated except that any sulfur compound was not added. In this case, a reaction proceeded at an inside temperature of about 100° C. The polymerization conversion was 62% after 1.5 hours, 67% after 3 hours and 70% after 6 hours since initiation of heating. A polymerized product had a number-average molecular weight of 63,000 and a weight-average molecular weight of 15,000,000, so that its molecular weight distribution became very broad, compared with the case of using a sulfur compound.

EXAMPLE 2-9

The procedure of EXAMPLE 2-1 was repeated except that the proportion of monomers was changed to 50 parts of acrylic acid, 22.5 parts of methyl methacrylate and 27.5 parts of ethyl acrylate, and that the amount of 2-ethylhexyl

TABLE 2-2

|  | Sulfur compound | Number-average molecular weight | Weight-average molecular weight | Molecular weight distribution | Acid value (mg/g) |
|---|---|---|---|---|---|
| EXAMPLE 2-4 | n-Dodecyl mercaptan | 19,000 | 35,000 | 1.84 | 360 |
| EXAMPLE 2-5 | Mercaptoethanol | 20,000 | 36,000 | 1.80 | 360 |
| EXAMPLE 2-6 | Thioglycolic acid | 19,000 | 37,000 | 1.94 | 380 | thioglycolate was changed to 2.4 parts. In this case, the polymerization proceeded under stable conditions without a runaway reaction. For a polymerized product, its number-average molecular weight, weight-average molecular weight, molecular weight distribution and acid value were shown in Table 2-3.

EXAMPLE 2-10

The procedure of EXAMPLE 2-1 was repeated except that the proportion of monomers was changed to 67 parts of acrylic acid, 15 parts of methyl methacrylate and 18 parts of ethyl acrylate. In this case, the polymerization proceeded under stable conditions without a runaway reaction. For a polymerized product, its number-average molecular weight, weight-average molecular weight, molecular weight distribution and acid value were shown in Table 2-3.

TABLE 2-3

| | Number-average molecular weight | Weight-average molecular weight | Molecular weight distribution | Acid value (mg/g) |
|---|---|---|---|---|
| EXAMPLE 2-9 | 10,000 | 18,000 | 1.79 | 390 |
| EXAMPLE 2-10 | 9,500 | 17,000 | 1.80 | 510 |

EXAMPLE 2-11

The procedure of EXAMPLE 2-1 was repeated except that the kind and amount of monomers were changed to 35 parts of methacrylic acid, 35 parts of methyl methacrylate and 30 parts of methyl acrylate. In this case, the polymerization proceeded under stable conditions without a runaway reaction. A polymerized product had a number-average molecular weight of 23,000, a weight-average molecular weight of 44,000, a molecular weight distribution of 1.9 and an acid value of 230 mg/g.

COMPARATIVE EXAMPLE 2-3

The procedure of EXAMPLE 2-1 was repeated except that the amount of 2-ethylhexyl thioglycolate was changed to 0.2 parts, that 0.3 parts of benzoyl peroxide and 100 parts of isopropanol were added, and that the temperature of oil bath was changed to 80° C. In this case, the inside temperature rose up to 135° C. after 10 minutes since initiation of heating, and a polymerization reaction proceeded recklessly.

A polymerized product had a number-average molecular weight of 5,200, a weight-average molecular weight of 31,000, a molecular weight distribution of 6.0 and an acid value of 365 mg/g.

EXAMPLE 2-12 and COMPARATIVE EXAMPLE 2-4

Physical properties of alkali-soluble injection moldings obtained by combining talc with the acrylic polymers for an alkali-soluble injection molding, which were obtained in EXAMPLE 2-1 and COMPARATIVE EXAMPLE 2-3, were measured by the following methods. Results obtained were shown in Table 2-4.
(I) Injection molding Into a twin screw extruder heated to 190° C. were placed 75 parts of the acrylic polymer for the injection molding and 25 parts of talc and mixed. Whereby homogeneous emulsified and melted matter was obtained, this matter was taken in the form of rope, and the rope was cut into a definite length to make it pellets. The pellets were processed into a test piece for the below dynamic test.
(II) Dynamic test The tensile test, bending test, Izod impact strength test were carried out according to the ASTM test method.

TABLE 2-4

| | Tensile strength (N/mm$^2$) | Elongation in fracture (%) | Bending strength (N/mm$^2$) | Modulus of bending elasticity (N/mm$^2$) | Impact strength (J.m) |
|---|---|---|---|---|---|
| EXAMPLE 2-1 | 50 | 0.5 to 0.7 | 82 | 11,000 | 62 |
| COMPARATIVE EXAMPLE 2-3 | 41 | 0.5 to 0.7 | 78 | 9,000 | 53 |

EXAMPLE 2-13

An apparatus similar to that in EXAMPLE 2-1 was used and a mixed solution comprising 20 parts of acrylic acid, 80 parts of ethyl acrylate and 0.2 parts of 2-ethylhexyl thioglycolate was heated by using an oil bath of 100° C. to initiate a polymerization reaction.

The inside temperature was about 100° C. and the polymerization proceeded without a runaway reaction. A polymerized product had a number-average molecular weight of 120,000, a weight-average molecular weight of 260,000 and a molecular weight distribution of 2.1. Also, the polymerized product was soluble in an aqueous sodium hydroxide solution and aqueous ammonia, and its acid value was measured, so that it was 150 mg/g. This polymerized product was soluble in THF, methanol and so forth, however, insoluble in chloroform, n-hexane and so forth.

The polymerized product of this composition can be processed into a transparent film by the blow molding and the like and can be used for a temporary protecting film and so forth by utilizing its solubility in an alkali.

COMPARATIVE EXAMPLE 2-5

The procedure of EXAMPLE 2-13 was repeated except that any sulfur compound was not added. In this case, an inside temperature rose up to 127° C. after about 35 minutes since initiation of heating, so that a reaction proceeded recklessly. A polymerized product obtained was insoluble in THF and gelation had proceeded.

EXAMPLES 2-14 and 2-15

The procedure of EXAMPLE 2-13 was repeated except that the amount of 2-ethylhexyl thioglycolate was changed to 4.0 parts in EXAMPLE 2-14 and to 1.0 part in EXAMPLE 2-15. In these cases, similarly, the polymerization proceeded under stable conditions without a runaway reaction.

For polymerized products, their number-average molecular weight, weight-average molecular weight, molecular weight distribution and acid value were shown in Table 2-5.

TABLE 2-5

| | Number-average molecular weight | Weight-average molecular weight | Molecular weight distribution | Acid value (mg/g) |
|---|---|---|---|---|
| EXAMPLE 2-14 | 7,700 | 15,000 | 1.95 | 150 |
| EXAMPLE 2-15 | 9,500 | 23,000 | 2.37 | 150 |

EXAMPLE 2-16

The procedure of EXAMPLE 2-13 was repeated except that the proportion of monomers was changed to 10 parts of acrylic acid and 90 parts of ethyl acrylate, and that the amount of 2-ethylhexyl thioglycolate was changed to 6.0 parts. In this case, the polymerization proceeded under stable conditions without a runaway reaction. A polymerized product had a number-average molecular weight of 8,900, a weight-average molecular weight of 16,000, a molecular weight distribution of 1.8 and an acid value of 75 mg/g. This polymerized product, 1 part, was soluble in each of 250 parts of 25% aqueous ammonia and 250 parts of a 20% aqueous solution of sodium hydroxide.

COMPARATIVE EXAMPLE 2-6

The procedure of EXAMPLE 2-13 was repeated except that the proportion of monomers was changed to 5 parts of acrylic acid and 95 parts of ethyl acrylate, and that the amount of 2-ethylhexyl thioglycolate was changed to 10 parts. In this case, the polymerization proceeded under stable conditions without a runaway reaction. A polymerized product had a number-average molecular weight of 9,900, a weight-average molecular weight of 17,000, a molecular weight distribution of 1.76 and an acid value of 40 mg/g. This polymerized product, 1 part, was insoluble in any of 250 parts of 25% aqueous ammonia and 250 parts of a 20% aqueous solution of sodium hydroxide.

EXAMPLE 2-17

Using an apparatus similar to that in EXAMPLE 2-1, a mixed solution comprising 20 parts of methacrylic acid, 80 parts of ethyl acrylate, 0.095 parts of 2-ethylhexyl thioglycolate was heated by using an oil bath of 100° C. to initiate a polymerization reaction.

The inside temperature was about 100° C. and the polymerization proceeded under stable conditions. A polymerized product had a number-average molecular weight of 99,000, a weight-average molecular weight of 168,000 and a molecular weight distribution of 1.7. This polymerized product was soluble in an aqueous sodium hydroxide solution and aqueous ammonia, and its acid value measured was 130 mg/g. The polymerized product was soluble in THF, methanol, ethanol and so forth, however, insoluble in chloroform, dioxane, n-hexane and so forth.

The polymerized product of this composition can be processed in to a film by blow molding or extrusion molding, and can be used for a temporarily protecting film and so forth by taking advantage of its alkali-solubility.

COMPARATIVE EXAMPLE 2-7

The procedure of EXAMPLE 2-17 was repealed except that 2-ethylhexyl thioglycolate was not added, that 0.2 parts of azobis(isobutyronitrile) and 100 parts of methanol were added, and that the temperature of oil bath was changed to 65° C. The inside temperature was about 65° C. and the polymerization proceeded under relatively stable conditions.

A polymerized product had a number-average molecular weight of 31,000, a weight-average molecular weight of 162,000, a molecular weight distribution of 5.2, and an acid value of 130 mg/g.

EXAMPLE 2-18 and COMPARATIVE EXAMPLE 2-8

For the acrylic polymers for an alkali-soluble film obtained in EXAMPLE 2-17 and COMPARATIVE EXAMPLE 2-7 there were measured physical properties as an adhesive by the following methods. Results obtained were shown in Table 2-6.

(I) Conversion into film

The acrylic polymer for the film was converted into a film by using an extruding kneader of small size. This extruder had two of healing regions comprising a mixing part and a slit nozzle, and, by extruding the melted matter, makes it possible to carry out molding into a film and so forth. A wide slit nozzle (0.2 mm in thickness and 40 mm in width) was set and the load of about 50 to 100 g was given, whereby a transparent film of about 50 μm film thickness was obtained.

(II) Dynamic test

The film obtained in the above (I) was cut in to 30 mm×10 mm to make a test piece, and a tensile test was carried out at a chuck interval of 10 mm and the test velocity of 100 mm/minute.

(III) Blocking resistance

The film obtained in the above (I) was cut in to 20 mm×20 mm to make test pieces, four of the test pieces were laminated between glass plates, and the load of 1 kg was given. They were stood under conditions of 25° C. and 50% relative humidity for 2 days, and then the judgement was carried out as follows.

5: No adhesion.

3: Adhesion, however, peeling-off was possible.

1: Entire blocking.

4: Adhesion of the medium between the above 5 and 3.

TABLE 2-6

| Polymer | Film-converting temperature (°C.) | Tensile strength (N/mm$^2$) | Elongation (%) | Blocking resistance |
|---|---|---|---|---|
| EXAMPLE 2-17 | 170 to 175 | 180 | 300 | 4 to 5 |
| COMPARATIVE EXAMPLE 2-7 | 165 to 175 | 150 | 210 | 4 |

EXAMPLE 2-19

Into a reaction vessel equipped with a stirrer, thermometer, condenser and dropping funnel was charged a mixed solution, 75.3 parts, comprising 19 parts of acrylic acid, 37 parts of styrene, 19 parts of ethylcarbitol acrylate and 0.3 parts of 2-ethylhexyl thioglycolate, the inside atmosphere of the vessel was sufficiently displaced by a nitrogen gas, and then the solution was heated by using an oil bath of 140° C. to initiate a polymerization reaction.

The dropping funnel was filled with a mixed solution, 25 parts, comprising 6.0 parts of acrylic acid, 12 parts of styrene, 6.5 parts of ethylcarbitol acrylate and 0.5 parts of 2-ethylhexyl thioglycolate and this solution was added dropwise during 120 minutes at the same time as initiation of the polymerization reaction. The inside temperature was about 140° C. and the polymerization reaction proceeded under stable conditions. After completion of the adding, the reaction was ceased by adding 0.2 parts of 6-tertiary-butyl-2,4-xylenol, and unreacted monomers were removed with distillation in a manner similar to EXAMPLE 2-1.

A polymerized product had a number-average molecular weight of 3,500, a weight-average molecular weight of 7,200 and a molecular weight distribution of 2.1. This polymerized product was soluble in an aqueous sodium hydroxide solution and aqueous ammonia, and its acid value measured was 175 mg/g. The polymerized product was soluble in THF, methanol, ethanol and so forth, however, insoluble in chloroform, dioxane, n-hexane and so forth.

The polymerized product of this composition is soluble in an alkali and can be used as a pigment-dispersing agent for water ink and so forth.

EXAMPLE 2-20

The procedure of EXAMPLE 2-19 was repeated except that two dropping funnels were used, one dropping funnel A was filled with a mixed solution comprising 7.4 parts of acrylic acid, 12.6 parts of styrene and 10.0 parts of ethylcarbitol acrylate, the other dropping funnel B was filled with 0.5 parts of 2-ethylhexyl thioglycolate, and the solution and 2-ethylhexyl thioglycolate were separately added dropwise from the funnels. In this case, similarly, the polymerization proceeded under stable conditions without a runaway reaction. Furthermore, the addition of 0.5 parts of 2-ethylhexyl thioglycolate was divided into ten times, 0.05 parts was added dropwise at the same time as initiation of the polymerization, and then 0.05 parts was equally added dropwise at every 12 minutes.

A polymerized product had a number-average molecular weight of 3,300, a weight-average molecular weight of 7,000, a molecular weight distribution of 2.1 and an acid value of 170 mg/g.

EXAMPLE 2-21

An apparatus similar to that in EXAMPLE 2-1 was used and a mixed solution comprising 25 parts of methacrylic acid, 25 parts of a monomer shown by the formula:

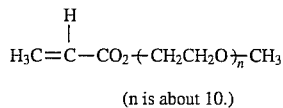

(n is about 10.)

50 parts of styrene and 2.0 parts of 2-ethylhexyl thioglycolate was heated by using an oil bath of 100° C. to initiate a polymerization reaction. In this case, the polymerization proceeded under stable conditions without a runaway reaction. A polymerized product had a number-average molecular weight of 32,000, a weight-average molecular weight of 69,000 and a molecular weight distribution of 2.2. This polymerized product was soluble in an aqueous sodium hydroxide solution and aqueous ammonia, and its acid value was measured, so that it was 160 mg/g. This polymerized product was soluble in THF, methanol and so forth, however, insoluble in chloroform, n-hexane and so forth.

The polymerized product of this composition, similarly to the case of EXAMPLE 2-19, is soluble in an alkali and can be used as a pigment-dispersing agent and the like for water ink and the like.

COMPARATIVE EXAMPLE 2-9

The procedure of EXAMPLE 2-19 was repeated except that the amount of 2-ethylhexyl thioglycolate in the mixed solution, which was charged into the reaction vessel, was changed to 0.2 parts, that 1.0 part of azob is(isobutyronitrile) and 75 parts of isopropanol were added to the mixed solution in the vessel, that the amount of 2-ethylhexyl thioglycolate in the mixed solution, with which the dropping funnel was filled, was changed to 0.3 parts, and that 1.5 parts of azobis(isobutyronitrile) and 25 parts of isopropanol were added to the mixed solution in the funnel. In this case, a polymerization reaction proceeded under relatively stable conditions.

A polymerized product had a number-average molecular weight of 2,400, a weight-average molecular weight of 12,000, a molecular weight distribution of 5.0 and an acid value of 170 mg/g.

EXAMPLES 2-22, 2-23 and COMPARATIVE EXAMPLE 2-10

For the acrylic polymers for water ink obtained in EXAMPLES 2-19, 2-20 and COMPARATIVE EXAMPLE 2-9 there were carried out evaluation of pigment-dispersibility and physical properties of water ink by the following methods.

(I) Pigment-dispersibility

① Preparation of water-soluble resin

| | |
|---|---|
| Acrylic polymer for water ink | 34.0 parts |
| 25% aqueous ammonia | 8.1 parts |
| Isopropanol | 3.0 parts |
| Propylene glycol | 1.5 parts |
| Water | 53.4 parts |

The above components were mixed and dissolved to prepare water-soluble resin.

② Pigment-dispersibility and viscosity stability

| | |
|---|---|
| Carbon black (MA-100B) | 35.5 parts |
| The water-soluble resin | 11.8 parts |
| Water | 35.8 parts |
| Isopropanol | 10.0 parts |

The above components as well as glass beads were dispersed by a paint shaker for 30 minutes to prepare a test sample, wherein a ratio of the pigment to the resin is 10. The test sample was preserved at 38° C. and the viscosity after 1 day, 4 days and 1 week was measured. Furthermore, the dispersion liquid after 1 day was coated onto kraft paper by a No. 4 bar coater, and the smoothness (outside appearance)

of coating film was observed. Results obtained were shown in Table 2-7. The measured values of physical properties shown in this table were based on the following methods.

1) Viscosity: This was measured by a B type viscometer.

2) Smoothness: This was judged by the naked eye as follows.

o: There was no shedding and lack of the image, and smooth surface condition was formed.

Δ: There was a little shedding and lack of the image, and formation of smooth surface condition lacked.

x: There was much shedding and lack of the image, and smooth surface condition was not formed.

3) Gloss: according to Japan Industrial Standard (JIS) K5400, the 60° specular gloss was measured.

TABLE 2-7

| Polymer | Viscosity of pigment-dispersed matter (cps) | | | | Outside appearance of coating film | |
|---|---|---|---|---|---|---|
| | Immediate after preparation | After 1 day | After 4 days | After 1 week | Smoothness | Gloss |
| EXAMPLE 2-19 | 250 | 256 | 260 | 282 | O | 49 |
| EXAMPLE 2-20 | 263 | 270 | 269 | 275 | O | 50 |
| COMPARATIVE EXAMPLE 2-9 | 340 | 355 | 380 | 798 | Δ | 45 |

5: Even if the tape was released rapidly and intensively, ink was not peeled off.

3: If the tape was released rapidly and intensively, ink was peeled off. However, in case of releasing the tape gradually, ink was not peeled off.

1: Even in case of releasing the tape gradually, intensively, ink was peeled off. However, in case of ink was peeled off.

4: Adhesive strength of the medium between the above 5 and 3.

2: Adhesive strength of the medium between the above 3 and 1.

2) Smoothness and 3) gloss were the same as those in the above ②.

4) Crumpling: The printed matter was crumpled strongly by both hands, and the crumpling time was recorded when the ink film at the crumpled part was peeled off in a ratio of 30 to 50%.

TABLE 2-8

| | Polyethylene film | | | | Kraft paper | | |
|---|---|---|---|---|---|---|---|
| Polymer | Adhesion | Smoothness | Gloss | Crumpling | Smoothness | Gloss | Crumpling |
| EXAMPLE 2-19 | 5 | O | 70 | 20 times or more | O | 70 | 50 times or more |
| EXAMPLE 2-20 | 5 | O | 72 | 20 times or more | O | 70 | 50 times or more |
| COMPARATIVE EXAMPLE 2-9 | 4 | Δ to O | 63 | 10 times | O | 65 | 20 times |

③ Water ink

| | |
|---|---|
| Chip of acrylic polymer (comprising 55% of acrylic polymer for water ink and 45% of carbon black) | 22 parts |
| Aqueous ammonia | 6 parts |
| Isopropanol | 10 parts |
| Water | 17 parts |
| Polyethylene wax emulsion (solid content 25%) | 5 parts |
| RC emulsion (J-734, made by Johnson Co., Ltd.) | 40 parts |

The above components were mixed and dissolved to prepare water ink. The ink was coated onto a polyethylene film and kraft paper by a No. 4 bar coater, and dried at room temperature for 30 minutes. Results obtained were shown in Table 2-8. The physical properties shown in this table were based on the following methods.

1) Adhesion: Peeling-off by a cellophane tape was carried out, and the judgement was carried out as follows.

EXAMPLE 2-24

Using an apparatus similar to that in EXAMPLE 2-1, a mixed solution comprising 30 parts of acrylic acid, 60 parts of ethyl acrylate, 10 parts of 2-ethylhexyl acrylate and 2.0 parts of pentaerythritol (tetrakis(thioglycolate)) was heated by using an oil bath of 110° C. to initiate a polymerization reaction.

The inside temperature was about 110° C. and the polymerization proceeded under stable conditions. A polymerized product had a number-average molecular weight of 14,000, a weight-average molecular weight of 22,000 and a molecular weight distribution of 1.6. This polymerized product was soluble in an aqueous sodium hydroxide solution and aqueous ammonia, and its acid value measured was 215 mg/g. The polymerized product was soluble in THF, methanol, ethanol and so forth, however, insoluble in chloroform, dioxane, n-hexane and so forth.

The polymerized product of this composition can be used as a hot melt adhesive.

COMPARATIVE EXAMPLE 2-11

The procedure of EXAMPLE 2-24 was repeated except that the amount of pentaerythritol(tetrakis(thioglycolate)) was changed to 1.0 parts, that 1.0 part of a zobis(isobutyronitrile) and 100 parts of ethanol were added, and that the temperature of oil bath was changed to 70° C. In this case, the inside temperature rose up to 130° C. after 8 minutes since initiation of heating, and a polymerization reaction proceeded recklessly.

A polymerized product had a number-average molecular weight of 16,000, a weight-average molecular weight of 88,000, a molecular weight distribution of 5.5 and an acid value of 220 mg/g.

EXAMPLE 2-25 and COMPARATIVE EXAMPLE 2-12

For the acrylic polymers for an alkali-soluble adhesive obtained in EXAMPLE 2-24 and COMPARATIVE EXAMPLE 2-11 there were measured physical properties as an adhesive by the following methods. Results obtained were shown in Table 2-9.

(I) Cohesion

The acrylic polymer for the adhesive was cut into 5×5×5 mm to make a test piece. This test piece was attached to an aluminum plate which was held vertically, they were stood in an oven of 80° C. for 12 hours, and then the cohesion was measured as the dripping length of test piece.

(II) Adhesion

To a polyethylene plate (1.5 mm in thickness and 20 mm in width) having a clean surface was coated the acrylic polymer for the adhesive at 190° C. so that the coating thickness was 1 mm and the coating are was 10 mm×20 mm, and then the adhesion was measured as the shear adhesive strength.

(III) Melt viscosity

Using the Rheometer flow tester made by Shimadzu Seisakusho Co., Ltd., the viscosity was measured. The viscosity at 180° C. was an index of melt coating operation performance.

TABLE 2-9

| Polymer | Cohesion (mm) | Adhesion (kg/cm$^2$) | Viscosity at 180° C. (cps) |
| --- | --- | --- | --- |
| EXAMPLE 2-24 | 0 | 5.5 | $7.3 \times 10^4$ |
| COMPARATIVE EXAMPLE 2-11 | 13 | 2.8 | $12.9 \times 10^4$ |

EXAMPLE 2-26

An apparatus similar to that in EXAMPLE 2-1 was used and a mixed solution comprising 70 parts of acrylic acid, 30 parts of stearyl acrylate and 2.0 parts of 2-ethylhexyl thioglycolate was heated by using an oil bath of 110° C. to initiate a polymerization reaction. In this case, the polymerization proceeded under stable conditions without a runaway reaction.

A polymerized product had a number-average molecular weight of 12,000, a weight-average molecular weight of 33,000 and a molecular weight distribution of 2.0. This polymerized product was soluble in an aqueous sodium hydroxide solution and aqueous ammonia, and its acid value was measured, so that it was 550 mg/g. This polymerized product was soluble in THF, methanol and so forth, however, insoluble in chloroform, n-hexane and so forth.

What is claimed is:

1. A process for producing an acrylic polymer, comprising:

providing a monomer component that contains 51 to 100 percent by weight of an acrylic monomer having a CH$_2$=CHCO— structure;

providing a sulfur compound in proportion of 0.001 to 20 parts by weight per 100 parts by weight of said monomer component, wherein said sulfur compound is at least one member selected from the group consisting of a mercaptan, a disulfide compound, a thiuram compound and a trisulfide compound;

mixing said monomer component and said sulfur compound to obtain a mixture; and heating the mixture, in the presence of an inactive gas and in the presence of a polymerization initiator in proportion by weight of one-third or less on the weight of the sulfur compound, to a temperature in the range of from 100° C. to 150° C. that results in a bulk polymerization reaction of said monomer component, and maintaining said temperature between 100° C. to 150° C. until the bulk polymerization reaction has been completed.

2. The process as claimed in claim 1, wherein the acrylic polymer obtained by the bulk polymerization reaction contains an acrylic monomer unit as a main component in said acrylic polymer and has a number-average molecular weight in a range of from 1,000 to 1,000,000, a glass transition temperature of −80° C. or higher and a molecular weight distribution (Mw/Mn) of 5 or less.

3. The process as claimed in claim 2, wherein the acrylic polymer contains the acrylic monomer unit in proportion of from 60 to 100% by weight and a crosslinkable functional group in proportion of from 0.01 to 1.4 mmol/g in said acrylic polymer and has the number-average molecular weight in a range of from 200,000 to 1,000,000, the glass transition temperature in a range of from −80° to 0° C. and the molecular weight distribution (Mw/Mn) of 3 or less.

4. The process as claimed in claim 2, wherein the acrylic polymer contains the acrylic monomer unit in proportion of from 60 to 100% by weight and a crosslinkable functional group in proportion of from 0.005 to 1.4 mmol/g in said acrylic polymer and has the number-average molecular weight in a range of from 10,000 to 500,000 and the glass transition temperature in a range of from −80° to −30° C.

5. The process as claimed in claim 2, wherein the acrylic polymer contains the acrylic monomer unit in proportion of from 51 to 100% by weight in said acrylic polymer and has an acid value of 65 mg/g or higher, the number-average molecular weight in a range of from 5,000 to 200,000, the glass transition temperature of 0° C. or higher and the molecular weight distribution (Mw/Mn) of 3 or less.

6. The process as claimed in claim 2, wherein the acrylic polymer contains the acrylic monomer unit in proportion of from 60 to 100% by weight in said acrylic polymer and has an acid value of 65 mg/g or higher, the number-average molecular weight in a range of from 10,000 to 500,000, the glass transition temperature of 0° C. or higher and the molecular weight distribution (Mw/Mn) of 4 or less.

7. The process as claimed in claim 2, wherein the acrylic polymer contains the acrylic monomer unit in proportion of from 60 to 100% by weight in said acrylic polymer and has an acid value of 65 mg/g or higher, the number-average molecular weight in a range of from 5,000 to 200,000, the glass transition temperature of 70° C. or higher and the molecular weight distribution (Mw/Mn) of 4 or less.

8. The process as claimed in claim 2, wherein the acrylic polymer contains the acrylic monomer unit in proportion of from 51 to 100% by weight in said acrylic polymer and has an acid value of 65 mg/g or higher, the number-average molecular weight in a range of from 1,000 to 50,000, the glass transition temperature of 30° C. or higher and the molecular weight distribution (Mw/Mn) of 3 or less.

9. The process as claimed in claim 1, wherein the step of heating the mixture is carried out in the absence of said polymerization initiator.

10. The process as claimed in claim 1, wherein said sulfur compound is a mercaptan.

11. The process as claimed in claim 10, wherein said mixture contains said mercaptan in proportion of from 0.001 to 1.0 part by weight per 100 parts by weight of said monomer component.

12. The process as claimed in claim 1, wherein said acrylic monomer is at least one member selected from the group consisting of acrylic acid, salts of acrylic acid and acrylic acid esters.

13. The process as claimed in any one of claims 1 and 9–12, wherein said monomer component contains either one or both of acrylic acid and methacrylic acid in totality of from 10 to 100 percent by weight.

14. The process as claimed in any one of claims 1 and 9–12, wherein said monomer component contains a crosslinkable monomer having a crosslinkable functional group and the content of said crosslinkable monomer is in a range of from 0.05 to 10 percent by weight in said monomer component.

15. The process as claimed in claim 1, wherein said bulk polymerization reaction is continuously carried out by preliminarily polymerizing said monomer component in a tank type reaction vessel and then passing the obtained, preliminarily polymerized product through a piston flow type reaction vessel.

16. The process as claimed in claim 1, wherein said monomer component contains 60 to 100 percent by weight of said acrylic monomer.

17. A process for producing an acrylic polymer which comprises the steps of preparing a mixture containing a monomer component containing 51 to 100% by weight of an acrylic monomer having a $CH_2=CHCO-$ structure, 0.001 to 20 parts by weight of at least one sulfur compound, selected from the group consisting of mercaptans, disulfides, thiurams and trisulfides, per 100 parts by weight of the monomer component; and heating the mixture to a temperature in the range of from 100° C. to 150° C., in the absence of a polymerization initiator and in the presence of an inactive gas, to bulk polymerize the monomer component, wherein the process does not comprise a step of adding a non-polymerizable organic solvent to a mixture to be polymerized and said temperature of from 100° C. to 150° C. is maintained until the bulk polymerization has been completed.

18. The process as claimed in claim 17, wherein the monomer component contains 60 to 100% by weight of the acrylic monomer.

19. The process as claimed in claim 17, wherein the sulfur compound is a mercaptan.

20. The process as claimed in claim 19, wherein the mixture contains from 0.001 to 1.0 part by weight of the mercaptan per 100 parts by weight of the monomer component.

21. The process as claimed in claim 17, wherein the acrylic monomer is at least one member selected from the group consisting of acrylic acid, salts of acrylic acid and esters of acrylic acid.

22. The process as claimed in claim 17, wherein the monomer component contains from 0.05 to 10 percent by weight of a monomer having a crosslinkable functional group.

23. The process as claimed in claim 17, wherein the bulk polymerization reaction is continuously carried out by preliminarily polymerizing the mixture of the monomer component and the sulfur compound in a tank type reaction vessel and then passing the preliminarily polymerized product through a piston flow type reaction vessel.

24. A process for producing an acrylic polymer which comprises the steps of preparing a mixture containing a monomer component containing 51 to 100% by weight of an acrylic monomer having a $CH_2=CHCO-$ structure, 0.001 to 20 parts by weight of at least one sulfur compound, selected from the group consisting of mercaptans, disulfides, thiurams and trisulfides, per 100 parts by weight of the monomer component, and up to ⅓ by weight of a polymerization initiator based on the weight of the sulfur compound; and heating the mixture to a temperature in the range of from 100° C. to 150° C., in the presence of an inactive gas, to bulk polymerize the monomer component, wherein the process does not comprise a step of adding a non-polymerizable organic solvent to a mixture to be polymerized and said temperature of from 100° C. to 150° C., is maintained until the bulk polymerization has been completed.

25. The process as claimed in claim 24, wherein the monomer component contains 60 to 100% by weight of the acrylic monomer.

26. The process as claimed in claim 24, wherein the sulfur compound is a mercaptan.

27. The process as claimed in claim 26, wherein the mixture contains from 0.001 to 1.0 part by weight of the mercaptan per 100 parts by weight of the monomer component.

28. The process as claimed in claim 24, wherein the acrylic monomer is at least one member selected from the group consisting of acrylic acid, salts of acrylic acid and esters of acrylic acid.

29. The process in claim 24, wherein the monomer component contains from 0.05 to 10% by weight of a monomer having a crosslinkable functional group.

30. The process as claimed in claim 24, wherein the bulk polymerization reaction is continuously carried out by preliminarily polymerizing the mixture of the monomer component and the sulfur compound in a tank type reaction vessel and then passing the preliminarily polymerized product through a piston flow type reaction vessel.

31. The process as claimed in claim 17, wherein the mixture is heated to about 120° C. and a polymerization intermediate is continuously removed, the bulk polymerization of said removed polymerization intermediate being continued at a temperature of about 110° C.

32. The process as claimed in claim 24, wherein the mixture is heated to about 120° C. and a polymerization intermediate is continuously removed, the bulk polymeriza tion of said removed polymerization intermediate being continued at a temperature of about 110° C.

33. The process as claimed in claim 1, wherein the temperature of said bulk polymerization reaction is maintained constant.

34. The process as claimed in claim 17, wherein the temperature of said bulk polymerization reaction is maintained constant.

35. The process as claimed in claim 24, wherein the temperature of said bulk polymerization reaction is maintained constant.

\* \* \* \* \*